US006955794B2

(12) United States Patent
Houston, Jr. et al.

(10) Patent No.: US 6,955,794 B2
(45) Date of Patent: Oct. 18, 2005

(54) SLOT DISCHARGE NON-THERMAL PLASMA APPARATUS AND PROCESS FOR PROMOTING CHEMICAL REACTION

(75) Inventors: Edward J. Houston, Jr., East Brunswick, NJ (US); Kurt Kovach, Highlands, NJ (US); Richard Crowe, Hazlet, NJ (US); Seth Tropper, Marlboro, NJ (US); Michael Epstein, Bedminster, NJ (US)

(73) Assignee: Plasmasol Corporation, Hoboken, NJ (US)

( * ) Notice: Subject to any disclaimer, the term of this patent is extended or adjusted under 35 U.S.C. 154(b) by 350 days.

(21) Appl. No.: 10/371,243

(22) Filed: Feb. 19, 2003

(65) Prior Publication Data

US 2004/0037756 A1 Feb. 26, 2004

Related U.S. Application Data

(63) Continuation-in-part of application No. 09/738,923, filed on Dec. 15, 2000, now Pat. No. 6,818,193.
(60) Provisional application No. 60/358,340, filed on Feb. 19, 2002, provisional application No. 60/171,324, filed on Dec. 21, 1999, and provisional application No. 60/171,198, filed on Dec. 15, 1999.

(51) Int. Cl.[7] .............................. B01D 53/00; H05F 3/04
(52) U.S. Cl. .................... 423/210; 204/157.3; 204/159; 204/164; 204/177; 204/179; 422/186.04; 423/235; 423/242.1; 423/245.1; 423/585
(58) Field of Search .............................. 204/157.3, 159, 204/164, 177, 179; 422/186.04; 423/210, 235, 242.1, 245.1, 585

(56) References Cited

U.S. PATENT DOCUMENTS

| | | |
|---|---|---|
| 3,594,065 A | 7/1971 | Marks |
| 3,948,601 A | 4/1976 | Fraser et al. |

(Continued)

FOREIGN PATENT DOCUMENTS

| | | | |
|---|---|---|---|
| EP | 1 084 713 A1 | 3/2001 | |
| EP | 1 378 253 A1 | 1/2004 | |
| WO | 0144790 | 6/2001 | .......... G01N/21/73 |
| WO | WO-02/49767 A1 | 6/2002 | |

OTHER PUBLICATIONS

International Search Report for PCT/US03/05222, dated Oct. 23, 2003.

(Continued)

*Primary Examiner*—Stanley S. Silverman
*Assistant Examiner*—Maribel Medina
(74) *Attorney, Agent, or Firm*—Darby & Darby

(57) ABSTRACT

A plasma reactor including a first dielectric having at least one slot defined therethrough, and a segmented electrode including a plurality of electrode segments, each electrode segment is disposed proximate an associated slot. Each electrode segment may be formed in different shapes, for example, a plate, bar, rim, or plug. The electrode segment may be hollow, solid, or made from a porous material. The reactor may include a second electrode and dielectric with the first and second dielectrics separated by a predetermined distance to form a channel therebetween into which the plasma exiting from the slots defined in the first dielectric is discharged. The fluid to be treated is passed through the channel and exposed to the plasma discharge. If the electrode segment is hollow or made of a porous material, then the fluid/gas to be treated may be fed into the slots defined in the first dielectric and exposed therein to the maximum plasma density. Thus, the fluid/gas to be treated may be exposed to the plasma discharge both in the slots as well as in the channel between the two dielectrics. The plasma reactor is more energy efficient than conventional devices and does not require a carrier gas to remain stable at atmospheric pressure. The plasma reactor has a wide range of application, such as the destruction of pollutants in a fluid, the generation of ozone, the pretreatment of air for modifying or improving combustion, and the destruction of various organic compounds, and surface cleaning of objects.

39 Claims, 17 Drawing Sheets

U.S. PATENT DOCUMENTS

| | | |
|---|---|---|
| 4,147,522 A | 4/1979 | Gonas et al. |
| 4,357,151 A | 11/1982 | Helfritch et al. |
| 4,698,551 A | 10/1987 | Hoag ..................... 313/619 |
| 4,818,488 A | 4/1989 | Jacob |
| 4,885,074 A | 12/1989 | Susko et al. ............... 204/298 |
| 4,898,715 A | 2/1990 | Jacob |
| 4,931,261 A | 6/1990 | Jacob |
| 5,033,355 A | 7/1991 | Goldstein et al. ............... 89/8 |
| 5,062,708 A | 11/1991 | Liang et al. ............... 356/316 |
| 5,084,239 A | 1/1992 | Moulton et al. |
| 5,115,166 A | 5/1992 | Campbell et al. |
| 5,178,829 A | 1/1993 | Moulton et al. |
| 5,184,046 A | 2/1993 | Campbell |
| 5,186,893 A | 2/1993 | Moulton et al. |
| 5,288,460 A | 2/1994 | Caputo et al. |
| 5,325,020 A | 6/1994 | Campbell et al. |
| 5,376,332 A | 12/1994 | Martens et al. |
| 5,387,842 A | 2/1995 | Roth et al. |
| 5,408,160 A | 4/1995 | Fox |
| 5,413,758 A | 5/1995 | Caputo et al. |
| 5,413,759 A | 5/1995 | Campbell et al. |
| 5,413,760 A | 5/1995 | Campbell et al. |
| 5,414,324 A | 5/1995 | Roth et al. |
| 5,451,368 A | 9/1995 | Jacob |
| 5,472,664 A | 12/1995 | Campbell et al. |
| 5,476,501 A | 12/1995 | Stewart et al. ............... 607/127 |
| 5,482,684 A | 1/1996 | Martens et al. |
| 5,498,526 A | 3/1996 | Caputo et al. |
| 5,549,735 A | 8/1996 | Coppom |
| 5,593,476 A | 1/1997 | Coppom |
| 5,593,550 A | 1/1997 | Stewart et al. ............... 204/164 |
| 5,593,649 A | 1/1997 | Fisher et al. |
| 5,594,446 A | 1/1997 | Vidmar et al. ................. 342/1 |
| 5,603,895 A | 2/1997 | Martens et al. |
| 5,620,656 A | 4/1997 | Wensky et al. |
| 5,637,198 A | 6/1997 | Breault |
| 5,645,796 A | 7/1997 | Caputo et al. |
| 5,650,693 A | 7/1997 | Campbell et al. |
| 5,667,753 A | 9/1997 | Jacobs et al. |
| 5,669,583 A | 9/1997 | Roth |
| 5,686,789 A | 11/1997 | Schoenbach et al. |
| 5,695,619 A | 12/1997 | Williamson et al. |
| 5,733,360 A | 3/1998 | Feldman et al. |
| 5,753,196 A | 5/1998 | Martens et al. |
| 5,872,426 A | 2/1999 | Kunhardt et al. ........... 313/582 |
| 5,939,829 A | 8/1999 | Schoenbach et al. |
| 6,007,742 A | 12/1999 | Czernichowski et al. |
| 6,016,027 A | 1/2000 | DeTemple et al. |
| 6,027,616 A | 2/2000 | Babko-Malyi ............... 204/164 |
| 6,055,349 A | 4/2000 | Seino et al. ............ 315/111.21 |
| 6,113,851 A | 9/2000 | Soloshenko et al. |
| 6,146,724 A | 11/2000 | Roth |
| 6,147,452 A | 11/2000 | Kunhardt et al. ........... 313/582 |
| 6,170,668 B1 | 1/2001 | Babko-Malyi ........... 209/127.1 |
| 6,228,330 B1 | 5/2001 | Herrmann et al. |
| 6,232,723 B1 | 5/2001 | Alexeff |
| 6,245,126 B1 | 6/2001 | Feldman et al. |
| 6,245,132 B1 | 6/2001 | Feldman et al. |
| 6,255,777 B1 | 7/2001 | Kim et al. |
| 6,322,757 B1 | 11/2001 | Cohn et al. ............ 422/186.04 |
| 6,325,972 B1 | 12/2001 | Jacobs et al. |
| 6,333,002 B1 | 12/2001 | Jacobs et al. |
| 6,365,112 B1 | 4/2002 | Babko-Malyi et al. |
| 6,372,192 B1 | 4/2002 | Paulauskas et al. ....... 423/447.1 |
| 6,375,832 B1 | 4/2002 | Eliasson et al. ............ 208/141 |
| 6,383,345 B1 | 5/2002 | Kim et al. |
| 6,395,197 B1 | 5/2002 | Detering et al. ............ 252/373 |
| 6,399,159 B1 | 6/2002 | Grace et al. ............... 427/536 |
| 6,433,480 B1 | 8/2002 | Stark et al. |
| 6,451,254 B1 | 9/2002 | Wang et al. |
| 6,458,321 B1 | 10/2002 | Platt, Jr. et al. |
| 6,475,049 B2 | 11/2002 | Kim et al. |
| 6,497,839 B1 | 12/2002 | Kasegawa et al. |
| 6,509,689 B1 | 1/2003 | Kim et al. |
| 6,545,411 B1 | 4/2003 | Kim et al. |
| 6,548,957 B1 | 4/2003 | Kim et al. |
| 6,570,172 B2 | 5/2003 | Kim et al. |
| 6,580,217 B2 | 6/2003 | Kim et al. |
| 6,598,481 B1 | 7/2003 | Schultz |
| 6,599,471 B2 | 7/2003 | Jacobs et al. |
| 6,627,150 B1 | 9/2003 | Wang et al. |
| 6,632,323 B2 | 10/2003 | Kim et al. |
| 6,635,153 B1 | 10/2003 | Whitehead |
| 6,673,522 B2 | 1/2004 | Kim et al. |
| 6,685,523 B2 | 2/2004 | Kim et al. |
| 6,818,193 B2 * | 11/2004 | Christodoulatos et al. .. 423/210 |
| 2001/0031234 A1 | 10/2001 | Christodoulatos et al. |
| 2002/0011203 A1 | 1/2002 | Kim |
| 2002/0011770 A1 | 1/2002 | Kim et al. |
| 2002/0045396 A1 | 4/2002 | Kim |
| 2002/0092616 A1 | 7/2002 | Kim |
| 2002/0105259 A1 | 8/2002 | Kim |
| 2002/0105262 A1 | 8/2002 | Kim |
| 2002/0122896 A1 | 9/2002 | Kim et al. |
| 2002/0124947 A1 | 9/2002 | Kim |
| 2002/0126068 A1 | 9/2002 | Kim et al. |
| 2002/0127972 A1 | 9/2002 | Kim et al. |
| 2002/0139659 A1 | 10/2002 | Yu et al. |
| 2002/0144903 A1 | 10/2002 | Kim et al. |
| 2002/0148816 A1 | 10/2002 | Jung et al. |
| 2002/0187066 A1 | 12/2002 | Yu et al. |
| 2003/0003767 A1 | 1/2003 | Kim et al. |
| 2003/0015505 A1 | 1/2003 | Yu et al. |
| 2003/0035754 A1 | 2/2003 | Sias et al. |
| 2003/0048240 A1 | 3/2003 | Shin et al. |
| 2003/0048241 A1 | 3/2003 | Shin et al. |
| 2003/0062837 A1 | 4/2003 | Shin et al. |
| 2003/0070760 A1 | 4/2003 | Kim et al. |
| 2003/0071571 A1 | 4/2003 | Yu et al. |
| 2003/0085656 A1 | 5/2003 | Kunhardt et al. |
| 2003/0127984 A1 | 7/2003 | Kim et al. |
| 2003/0134506 A1 | 7/2003 | Kim et al. |
| 2003/0141187 A1 | 7/2003 | Sohn et al. |
| 2004/0022673 A1 | 2/2004 | Protic |

OTHER PUBLICATIONS

Vidmar, R.J., "On the Use of Atmospheric Pressure Plasmas as Electromagnetic Reflectors and Absorbers", *IEEE Transactions on Plasma Science*, vol. 18 No. 4, Aug. 1990; pp. 733–741.

Kunhardt, E.E., "Generation of Large–Volume, Atmospheric–Pressure, Nonequilibrium Plasmas", *IEEE Transactions on Plasma Science*, vol. 28 No. 1, pp. 189–200, Feb. 2000.

Penetrante et al., "Non–Thermal Plasma Techniques for Abatement of Violatile Organic Compounds and Nitrogen Oxides", *INP Report XIII*, pp. 18–46 (1996).

Chen D.C.C., Lawton, J., and Weinberg, F.J., Augmenting Flumes with Electric Discharges. *Tenth Symposium (Int'l) on Combustion*, pp. 743–754 (1965).

Becker, K. v. Tarnovsky, V., *Plasma Sources Science and Technology*, vol. 4, pp. 307–315 (1995).

Knight, Henry de Boyne, The Arc Discharge; Its Application to Power Control, London *Chapman & Hall* (1960).

L.A. Rosenthal and D.A. Davis, "Electrical Characterization of a Corona Discharge for Surface Treatment", *IEEE Transactions on Industry Applications*, vol. 1A–11, No. 3, pp. 328–335 (May/Jun. 1975).

S. Han, Y. Lee, H. Kim, J. Lee, J. Yoon, and G. Kim, "Polymer Surface Modification by Plasma Source Ion Implantation", *Surfaces and Coatings Technology*, vol. 93, pp. 261–264 (1997).

Kolman et al., "Genotoxic effects of ethylene oxide, propylene oxide and epichlorohydrin in humans: update review" (1990–2001), Mutation Research 512 (2002) 173–194.

Schoenbach, K. et al., "Special Issue on Nonthermal Medical/Biological Treatments Using Electromagnetic Fields and Ionized Gases", IEEE Transactions on Plasma Science, vol. 28, No. 1, Feb. 2000; pp. 2–4.

Jacobs, Paul T., "STERRAD 100S" Sterilization System; Advanced Sterilization Products.

S. Harpless et al. "Interaction of Organophosphonates with $O(^3P)$, $N(^4S)$, $)2(a^1\ g)$, and $O_3$", Non–Thermal Plasma Techniques or Pollution control, Nato ASI Series, Series G vol. 34,Part A, p. 123–137 (1993).

Paur, "Removal of Volatile Hydrocarbons From Industrial Off–Gas", Non–Thermal Nato ASI Series, vol. G34 Part B, p. 77–89 (1993).

Mizuno et al. "Application of Corona Technology in the Reduction of Greenhouse Gases and Other Gaseous Pollutants", Non–Thermal Plasma Techniques for Pollution Control, Nato ASI Series G vol. 34 Part B, 165–185 (1993).

Yamamoto et al., "Decomposition of Volatile Organic Compounds By a Packed–Bed Reactor and a Pulsed–Corona Plasma Reactor", Non–Thermal Plasma Techniques for Pollution Control, Nato ASI Series, G, vol. 34, Part B, p. 223–237 (1993).

Rosocha et al., "Treatment of Hazardous Organic Wastes Using Silent Discharge Plasmas", Non–Thermal Plasma Techniques for Pollution Control, Nato ASI Series G vol. 34 Part B, p. 281–308 (1993).

Babko–Malyi, Sergei and Nelson, Gordon L., "Experimental Evaluation of Capillary Korona Discharges", American Institute of Aeronautics and Astronautics, 30th Plasmadynamics and Lasers Conference: AIAA–99–3488 (Jun. 28–Jul. 1, 1999) pp. 1–14.

Stark, et al., "Direct Current Glow Discharges in Atmospheric Air", American Institute of Aeronautics and Astronautics, 30th Plasmadynamics and Lasers Conference: AIAA–99–3666 (Jun. 28–Jul. 1, 1999), pp. 1–5.

Babko–Malyi, Sergei, "Ion–drift Reactor Concept", Fuel Processing Technology (1999), pp. 231–246.

Broer, S., Th. Hammer, Romheld, M., "Treatment of Diesel–Engine Exhaust by Silent Discharge Plasma" INP Report XIII (1996).

Christ, Jr., Buckley, "Leak Testing of Tank Linings by High Voltage Discharge", ElectroTechnic Products, Inc. Guide for Using Company's Probes (1993).

Tarnovsky, V., et al., "Electron–impact ionization of atoms, molecules, ions and transient species", Plasma Sources Science and Technology, vol. 4, pp. 307–315 (1995).

Lawton, James, et al., Electrical Aspects of Combustion, Clarendon Press, Oxford (1969).

* cited by examiner

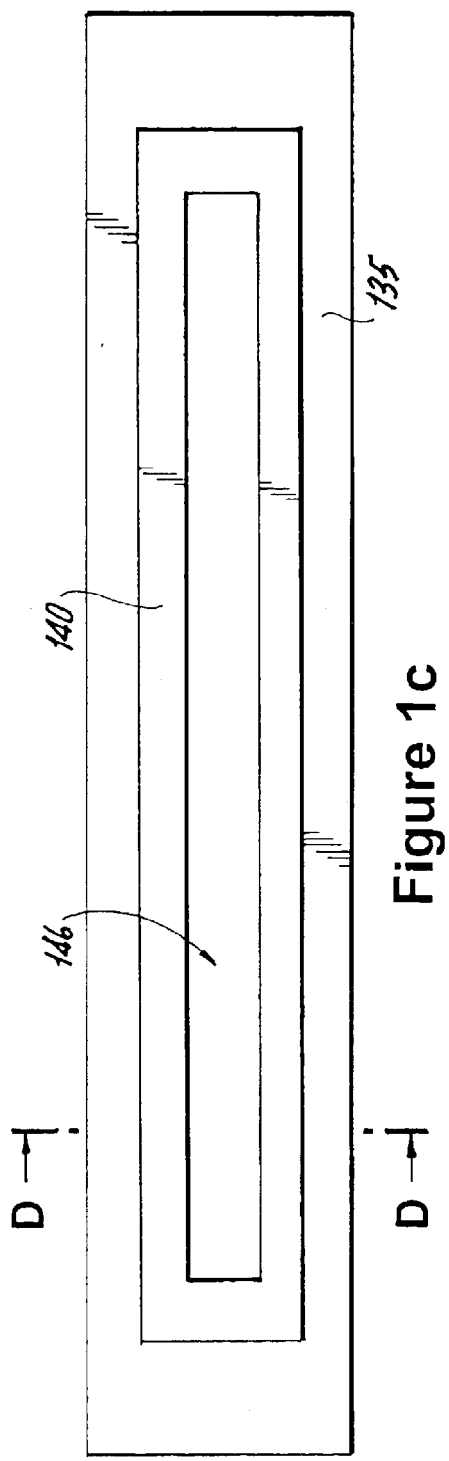
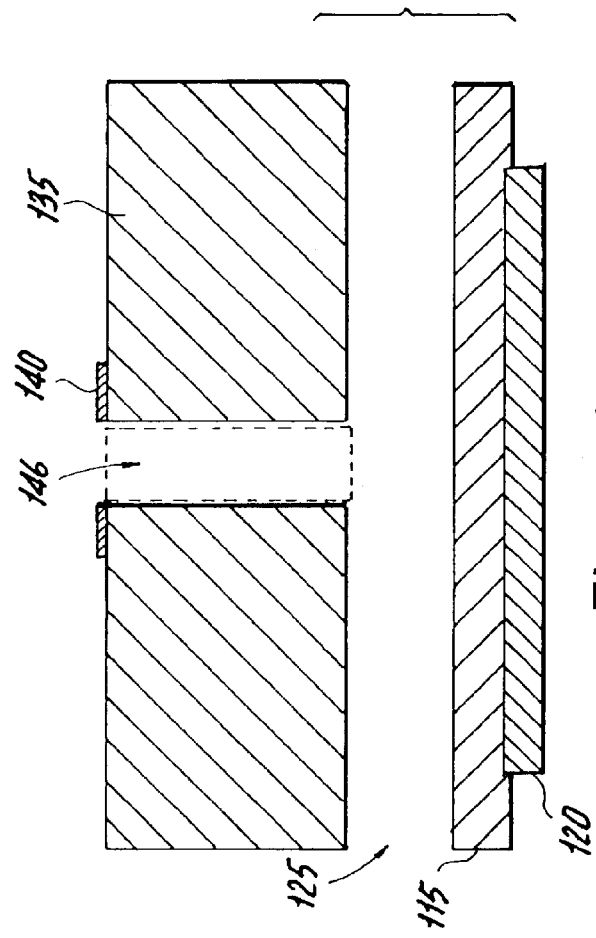
Figure 1c
Figure 1d

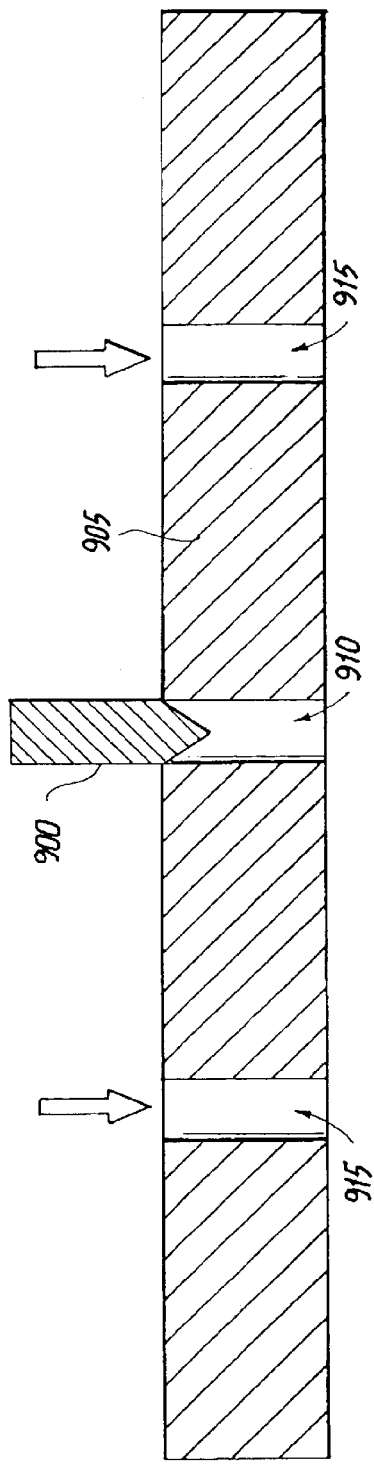
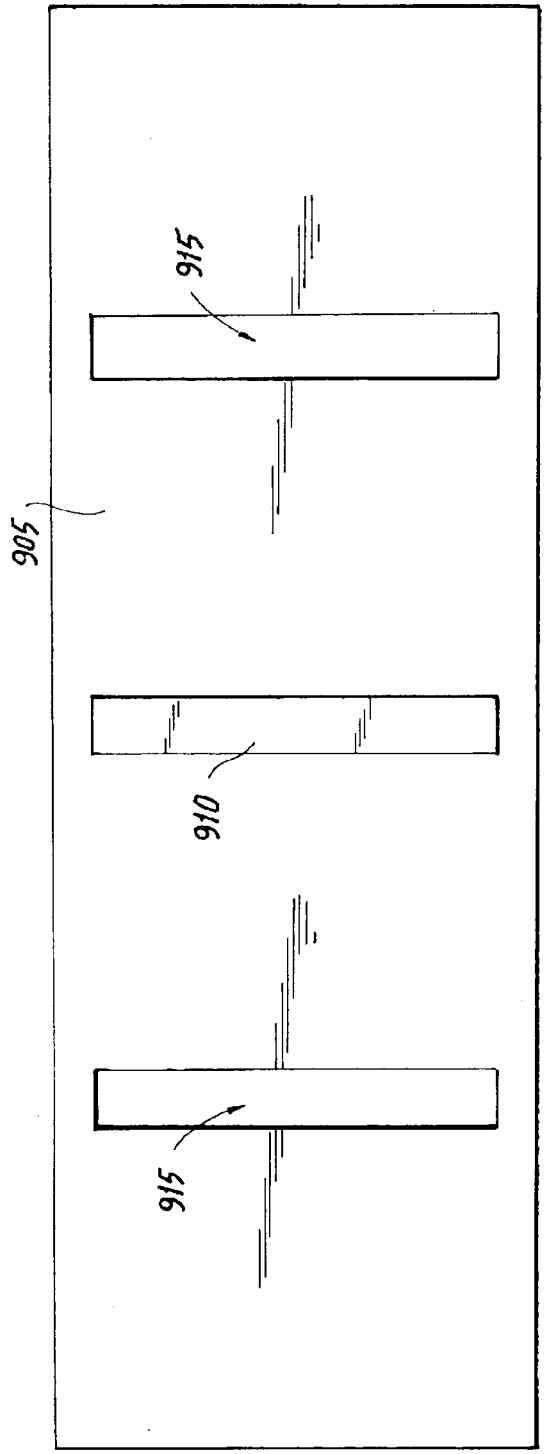
Figure 9a
Figure 9b

SLOT DISCHARGE NON-THERMAL PLASMA APPARATUS AND PROCESS FOR PROMOTING CHEMICAL REACTION

CROSS-REFERENCE TO RELATED APPLICATIONS

This application claims the benefit of U.S. Provisional Application No. 60/358,340, filed Feb. 19, 2002, and is a continuation-in-part of U.S. patent application Ser. No. 09/738,923, filed Dec. 15, 2000 now U.S. Pat. No. 6,818,193, which claims the benefit of U.S. Provisional Application No. 60/171,198, filed Dec. 15, 1999 and U.S. Provisional Application No. 60/171,324, filed Dec. 21, 1999, which are all hereby incorporated by reference in their entirety.

BACKGROUND OF THE INVENTION

1. Field of the Invention

The present invention is directed to a system and method for generating plasma discharge and, in particular, to a slot discharge, non-thermal plasma process and apparatus the produces a higher volume of plasma.

2. Description of Related Art

A "plasma" is a partially ionized gas composed of ions, electrons, and neutral species. This state of matter is produced by relatively high temperatures or relatively strong electric fields either constant (DC) or time varying (e.g., RF or microwave) electromagnetic fields. A plasma discharge is produced when free electrons are energized by electric fields in a background of neutral atoms/molecules. These electrons cause electron atom/molecule collisions which transfer energy to the atoms/molecules and form a variety of species which may include photons, metastables, atomic excited states, free radicals, molecular fragments, monomers, electrons, and ions. The neutral gas becomes partially or fully ionized and is able to conduct currents. The plasma species are chemically active and/or can physically modify the surface of materials and may therefore serve to form new chemical compounds and/or modify existing compounds. Discharge plasmas can also produce useful amounts of optical radiation to be used for lighting. Numerous other uses for plasma discharge are available.

U.S. Pat. Nos. 5,872,426; 6,005,349; and 6,147,452, each of which is herein incorporated by reference in their entirety, describe a glow plasma discharge device for stabilizing glow plasma discharges by suppressing the transition from glow-to-arc. A dielectric plate having an upper surface and a lower surface and a plurality of holes extending therethrough is positioned over a cathode plate and held in place by a collar. Each hole in the dielectric acts as a separate active current limiting micro-channel that prevents the overall current density from increasing above the threshold for the glow-to-arc transition. The use of capillaries in a cathode plate while successful in limiting the current in order to suppress the glow-to-arc transition also limits the amount of plasma produced. To increase the amount of plasma produced we need to increase the percentage of overall cathode area that the current limiting system occupies.

It is therefore desirable to develop a device that solves the aforementioned problem while generating a relatively large volume of non-thermal plasma.

SUMMARY OF THE INVENTION

The present invention consists of a system for generating non-thermal plasma reactor system to facilitate chemical reactions. Chemical reactions are promoted by making use of the non-thermal plasma generated in a slot discharge non-thermal plasma reactor, which can operate under various pressure and temperature regimes including ambient pressure and temperature. The device uses a relatively large volume, high density, non-thermal plasma to promote chemical reaction upon whatever gas, fluid and/or solid surface is passed through the plasma (either passed through the slot or passed through the resulting plasma jet emitted from the slot). Several examples of the chemistry capable of being performed using the apparatus and method in accordance with the present invention include the destruction of pollutants in a fluid stream, the generation of ozone, the pretreatment of air for modifying or improving combustion, the destruction of various organic compounds, or as a source of light. Additionally, chemistry can be performed on the surface of dielectric or conductive materials by the dissociation and oxidation of their molecules. In the case of pure hydrocarbons complete molecular conversion will result in the formation of carbon dioxide and water, which can be released directly to the atmosphere without any harmful health consequences.

The reactor in accordance with the present invention is designed so that the gaseous and/or liquid stream containing chemical agents such as pollutants are exposed to the relatively high density plasma region where various processes such as oxidation, reduction, ion induced decomposition, or electron induced decomposition efficiently allow for chemical reactions to take place. The ability to vary the plasma characteristics allows for tailored chemical reactions to take place by using conditions that effectively initiates or promotes the desired chemical reaction without heating up the bulk gases.

A plasma reactor includes a first dielectric having at least one slot defined therethrough and a first electrode, preferably a segmented electrode including a plurality of electrode segments, wherein each electrode segment is disposed proximate an associated slot. Each electrode segment may be formed in different shapes, for example, a plate, bar, rim, or plug. The electrode segment may be hollow, solid, or made from a porous material. The reactor may include a second electrode and dielectric with the first and second dielectrics separated by a predetermined distance to form a channel therebetween into which the plasma exiting from the slots defined in the first dielectric is discharged. The fluid to be treated is passed through the channel and exposed to the plasma discharge. If the electrode segment is hollow or made of a porous material, then the fluid/gas to be treated may be fed into the slots defined in the first dielectric and exposed therein to the maximum plasma density. Thus, the fluid/gas to be treated may be exposed to the plasma discharge both in the slots as well as in the channel between the two dielectrics. The plasma reactor is more energy efficient than conventional devices and does not require a carrier gas to remain stable at atmospheric pressure. The plasma reactor has a wide range of application, such as the destruction of pollutants in a fluid, the generation of ozone, the pretreatment of air for modifying or improving combustion, and the destruction of various organic compounds, and surface cleaning of objects.

BRIEF DESCRIPTION OF THE DRAWING

The foregoing and other features of the present invention will be more readily apparent from the following detailed description and drawings of illustrative embodiments of the invention wherein like reference numbers refer to similar elements throughout the several views and in which:

FIG. 1c is a top view of a single electrode segment and associated slot in the plasma reactor system in FIG. 1a;

FIG. 1d is a lateral cross-sectional view of the arrangement of a single electrode segment and associated slot in the reactor system in FIG. 1a;

FIG. 5b is a top view of the electrode segment of FIG. 5a;

FIG. 6b is a top view of the electrode segment of FIG. 6a;

FIG. 7b is a top view of the electrode segment of FIG. 7a;

FIG. 8b is a top view of the electrode segment of FIG. 8a;

FIG. 9a is a cross-sectional view of an electrode segment associated with one slot of the first dielectric also having auxiliary slots defined therein for the injection of a reagent fluid;

FIG. 9b is a top view of the embodiment of FIG. 9a;

FIG. 10b is a top view of the embodiment of FIG. 10a;

DETAILED DESCRIPTION OF THE INVENTION

The slot discharge non-thermal plasma reactor in accordance with the present invention is designed so that a solid and/or a fluid (e.g., a liquid, vapor, gas, or any combination thereof) containing chemical agents, for example, an atomic element or a compound, is exposed to a relatively high density plasma in which various processes, such as oxidation, reduction, ion induced composition and/or electron induced composition, efficiently allow for chemical reactions to take place. By way of example, the chemical agents may be Volatile Organic Compounds (VOCs), Combustion Air or Combustion Exhaust Gases. The ability to vary the energy density allows for tailored chemical reactions to take place by using enough energy to effectively initiate or promote desired chemical reactions without heating up the bulk gas.

By way of example, the present invention is shown and described with respect to the application of using the plasma reactor to purify or treat a contaminated fluid. It is, however, within the intended scope of the invention to use the device and method for other applications such as the treatment of fluids, vapors, gases, or any combination thereof. Furthermore, the inventive plasma reactor may be used for the treatment of solid or porous surfaces.

Figure 1A:
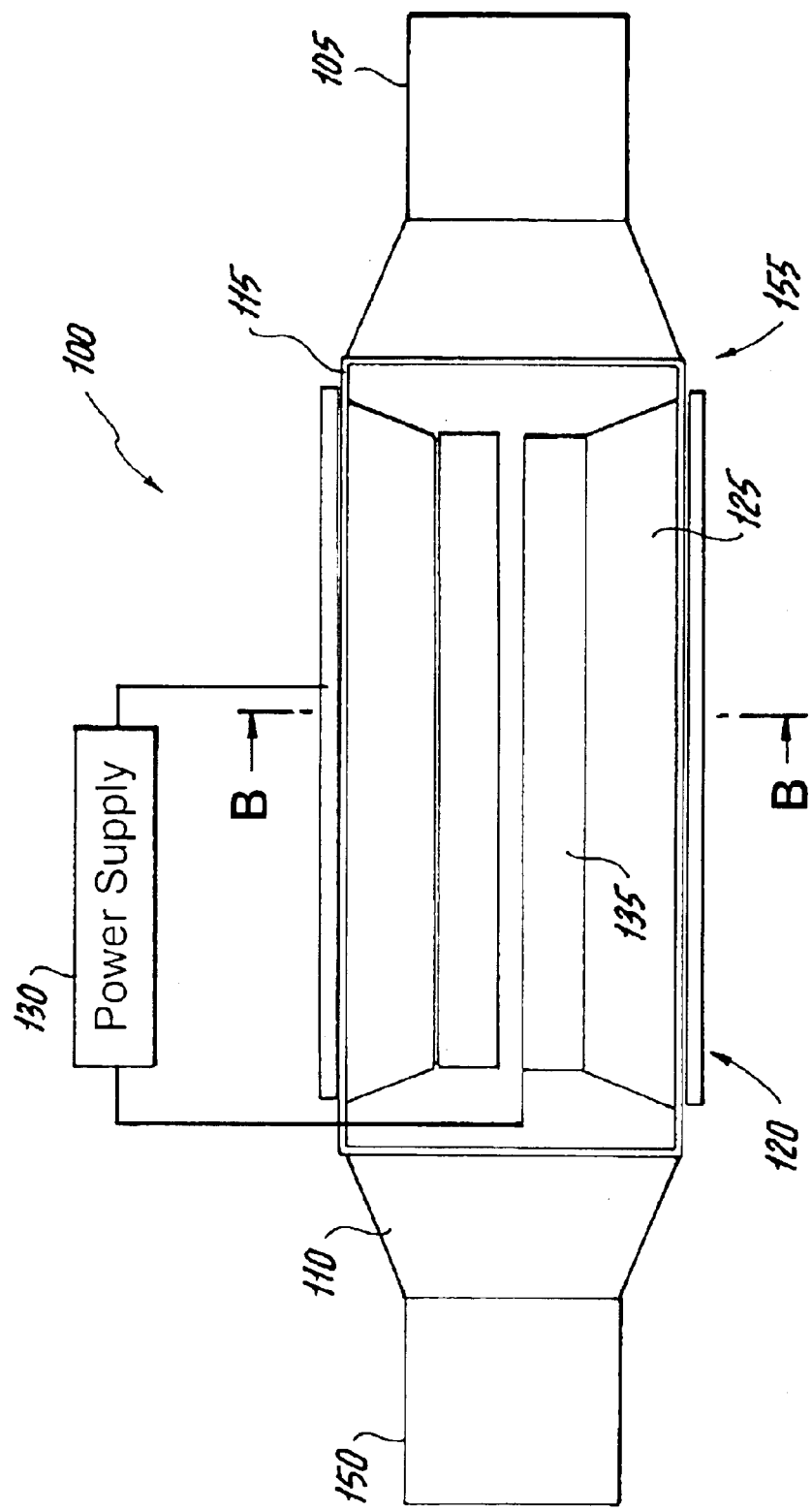
FIG. 1a is a longitudinal cross-sectional view of an exemplary single annular slot discharge plasma reactor system in accordance with the present invention.
Figure 1B:
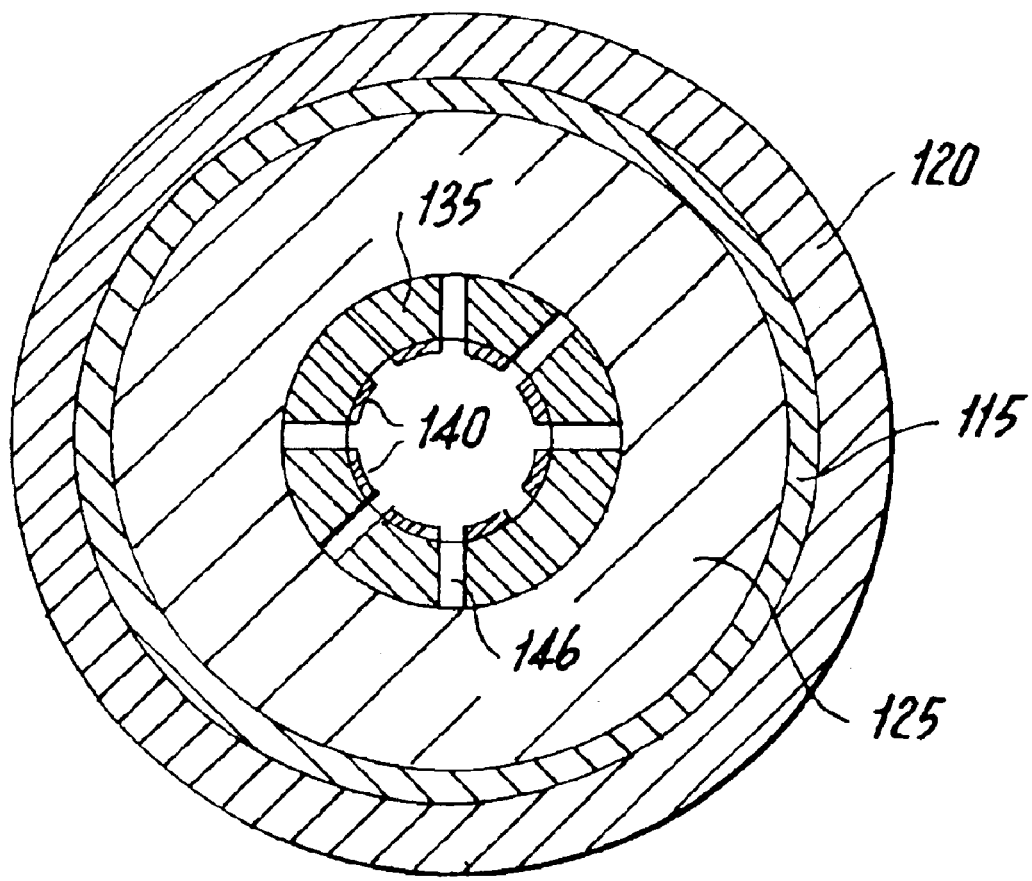
FIG. 1b is a lateral cross-sectional view of the plasma reactor system of FIG. 1a along line B—B.

Longitudinal and lateral cross-sectional views of an exemplary single annular slot discharge plasma reactor system in accordance with the present invention are shown in FIGS. 1a and 1b, respectively. The annular slot discharge plasma reactor 100 in FIG. 1a includes an inlet 150 for receiving the fluid to be treated and an outlet 105 through which the treated fluid is emitted from the reactor. A flow transition conduit 110 is disposed between the inlet 150 and a reaction chamber 155 to streamline the flow of fluid to be treated. That is, the flow transition conduit 110 distributes the fluid to be treated substantially uniformly prior to its introduction into the reaction chamber 155. Reaction chamber 155 includes a second dielectric 115 and a second electrode 120. The second electrode 120 is disposed circumferentially about at least a portion of the outer surface of the second dielectric 115 and extends in a longitudinal direction along at least a portion of the length of the reaction chamber 155. In a preferred embodiment, the second electrode 120 is insulated and composed of a metallic or non-metallic conductor.

Within the reaction chamber 155 is an annular first dielectric 135 having a plurality of longitudinally arranged slots 146 defined radially outward therethrough. A "slot" is defined as an aperture or opening whose length is greater than its width and whose maximum length is limited only by the dimensions of the dielectric in which it is defined. For example, the slot may have a width of about 1/32 inch and about 16 inches in length (i.e., a ratio of length to width of 512:1) in the first dielectric plate. A one inch border may be retained between the end of the slot and the end of the dielectric plate. The slots may be arranged so that adjacent slots are separate from one another by about ⅛ inch. This example and its dimensions are not intended to limit the scope of the present invention. In a preferred embodiment, the length to width ratio is at least approximately 10:1. Greater length to width ratios are possible even ratios larger in size by orders of magnitude such as at least approximately 100:1 or at least approximately 1000:1. In another embodiment, the length to width ratio is approximately 10:1 to approximately 100:1, 1000:1, or 10000:1 or approximately 100:1 to approximately 1000:1 or 10000:1. These are but a few examples, other length to width slot ratios are contemplated and within the intended scope of the invention.

In a capillary discharge plasma reactor the capillary dimensions are substantially equal to one another in the x-y plane defined as the lateral plane substantially transverse to the longitudinal or axial direction of the capillary. Thus, there is little, if any, difference in which radial direction the electron drifts as it travels down the capillary since the probability of quenching (colliding with a wall) prior to emerging from the capillary is substantially equivalent in both the x- and y-directions. In the case of a slot the length, e.g., the y-direction, is substantially greater than that of its width, e.g., the x-direction. Preferably, the length to width ratio of the slot is at least approximately 10 to 1. As a result of this substantially greater length to width ratio, the probability that an electron while drifting in a z-direction down the slot through the dielectric will collide or interact with the wall before emerging from the slot is significantly reduced. This reduction in the probability of wall collisions means less quenching and thus a higher plasma density per unit area of slot cross-section as compared to plasma density per unit area of a capillary discharge configuration. Despite the decreased quenching the slot still adequately suppresses glow-to-arc transition.

In addition, regardless of the number of capillaries arranged in series one after the other packed together, the slot configuration in accordance with the present invention is able to generate a greater volume of high density plasma relative to that of the capillary discharge design. Thus, a significantly greater area and volume of high density plasma may be realized using the slot configuration in comparison to that of the capillary configuration described in the parent application (U.S. patent application Ser. No. 09/738,923, filed Dec. 15, 2000). As a result of the increased volume of high density plasma generated, a relatively large volume of fluid/gas to be treated may be exposed to the plasma. Moreover this slot configuration may be readily and inexpensively manufactured.

Referring to FIGS. 1a and 1b, a plasma is generated in a channel 125 defined between the first and second dielectrics 135, 115, respectively. Disposed centrally inward of the first dielectric 135 is a first electrode 140. In the preferred embodiment shown in FIG. 1b, the first electrode 140 comprises a plurality of electrode segments each shaped as a substantially rectangular rim disposed proximate and in fluid communication with each associated slot 146 in the first dielectric. Other configurations of the electrode segments are described in detail later. Alternatively, a single first electrode such as an annular tube or plate may be used instead of a plurality of electrode segments. A power supply 130 is connected to the second electrode 120 and the first electrode 140 and a voltage difference is applied thereto. Throughout this description any conventional material may be used as a dielectric such as glass or ceramic. The first and second dielectrics may be the same or different materials.

Although shown in FIG. 1a as a single annular cylinder, the second electrode 120 may alternatively be a segmented electrode comprising a plurality of electrode segments (e.g., plurality of longitudinal or axially arranged electrode strips disposed proximate and in fluid communication with each associated slot 146). Alternatively, the second electrode 120 and second dielectric 115 may be eliminated altogether.

As previously mentioned, FIGS. 1a and 1b show each electrode segment 140 in the shape of a rectangular rim disposed about the perimeter of and in fluid communication with each associated slot 146 defined in the first dielectric 135. Enlarged top and cross-sectional views of a single rectangular rim shaped electrode segment 140 with a hollow opening are shown in FIGS. 1c and 1d, respectively. As shown in FIG. 1d, the rectangular shaped electrode segment 140 is disposed in contact with the first dielectric 135. In an alternative embodiment. Alternatively, electrode segment 140 may be disposed above and separated from the first dielectric 135 by a predetermined distance, or a portion thereof may extend a predetermined depth into the slot 146 like a plug. If the first electrode 140 is hollow or porous, then the fluid to be treated may be passed through and exposed to the maximum plasma density generated in the slots 146 defined in the first dielectric 135 as well as in the plasma region between the two dielectrics 115, 135.

Plasma is generated in a channel 125 between the dielectrics 115, 135 and in the slots 146 defined in the first dielectric 135. The slots 146 defined in the first dielectric 135 can vary in diameter, preferably from a few microns to a few millimeters, and can also vary in density or spacing relative to one another. The density or spacing of the slots 146 may be varied, as desired, so as to generate a plasma discharge over a portion or the entire width of the reaction chamber 155. In addition, the width of the slots 146 may be selected so as to obtain a desired slot plasma action.

In operation, fluid to be treated is received at the inlet 150 and passed through the transition conduit 110 into the channel 125 of the reaction chamber 155. If the electrode segments 140 are hollow (or porous) and substantially aligned with the slots 146, as shown in FIG. 1d, then a reagent fluid may be injected into the slots 146. A slot plasma discharge is created in the slots 146 and the channel 125 upon the application of a voltage differential generated from the power supply 130 applied to the first and second electrodes 140, 120, respectively. The plasma discharge produces chemical reactions that destroy the contaminants in the fluid to be treated. Accordingly, treatment of the contaminated fluid by exposure to the plasma may occur in the slots 146 and/or the channel 125. The plasma generated in the slots 146 and channel 125 promotes chemical reactions that facilitate processes such as the destruction of contaminants.

Figure 1E:
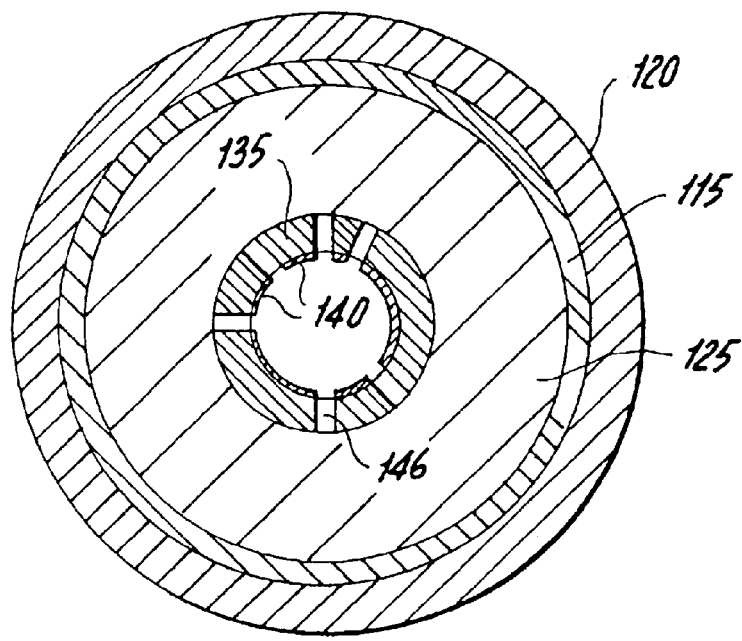
FIG. 1e is a lateral cross-sectional view of another embodiment of a single annular segmented electrode slot discharge plasma reactor system in accordance with the present invention with a hollow inner segmented electrode having a substantially uniform thickness and varied slot density in the first dielectric.
Figure 1F:
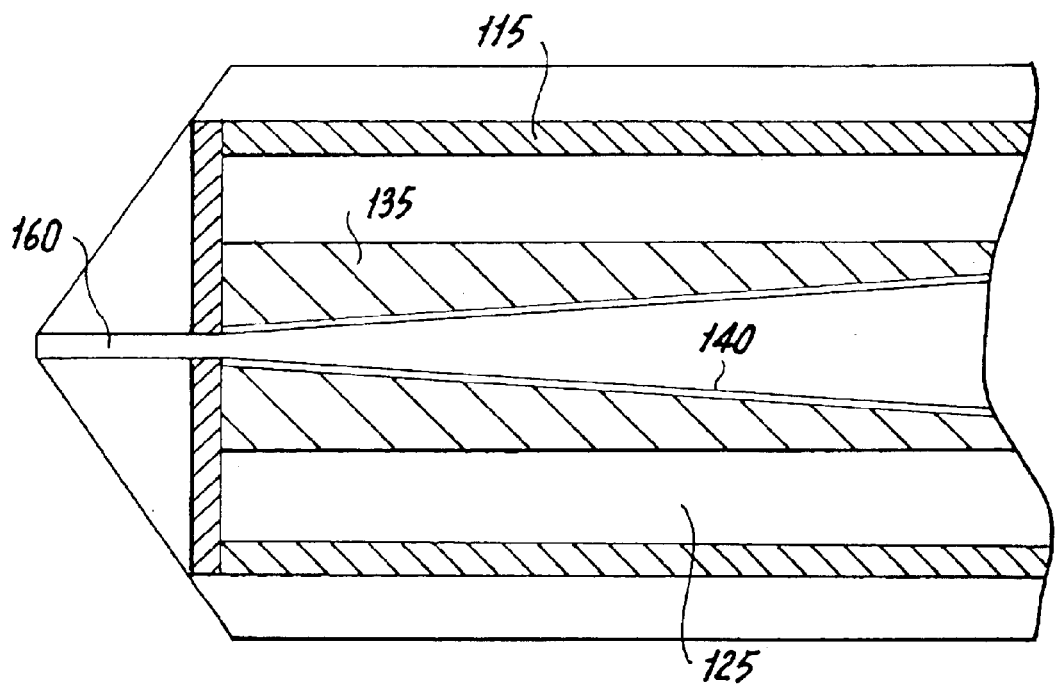
FIG. 1f is a longitudinal cross-sectional view of yet another embodiment of a single annular segmented electrode slot discharge plasma reactor system in accordance with the present invention with a first dielectric having a nonuniform thickness and substantially uniform slot hole density.

FIGS. 1e and 1f show exemplary alternative embodiments of a single annular slot discharge plasma reactor in accordance with the present invention. Despite their overall similar configuration, the embodiments shown in FIGS. 1e and 1f differ with respect to the first dielectric 135 and first electrode 140. Specifically, the first electrode 140 in FIG. 1e has a substantially uniform cross-section (thickness) defined in the first dielectric 170 along the longitudinal length of the reaction chamber. However, the density (spacing) of the slots defined in the first dielectric 135 and/or the width of the slots themselves is varied along the longitudinal length of the reaction chamber to achieve substantially uniform flow therein or to tailor the chemical reactions along the longitudinal length. In contrast, FIG. 1f shows the inner segmented electrode 140 having a non-uniform cross-section (thickness) defined in the first dielectric along the longitudinal length of the reaction chamber while the density of the slots is substantially uniform. During operation of either embodiment shown in FIGS. 1e and 1f, the fluid to be treated enters the inlet 160 and passes into the hollow inner U-shaped first electrode 140 closed off at end 185. Once within the hollow inner portion of the first electrode 140, the fluid to be treated passes through openings in the first electrode and then into the slots defined in the first dielectric 135. Furthermore, the fluid to be treated passes through and is exposed to the plasma generated in the channel 135 defined between the first and second dielectrics 135, 115, respectively.

Figure 2A:
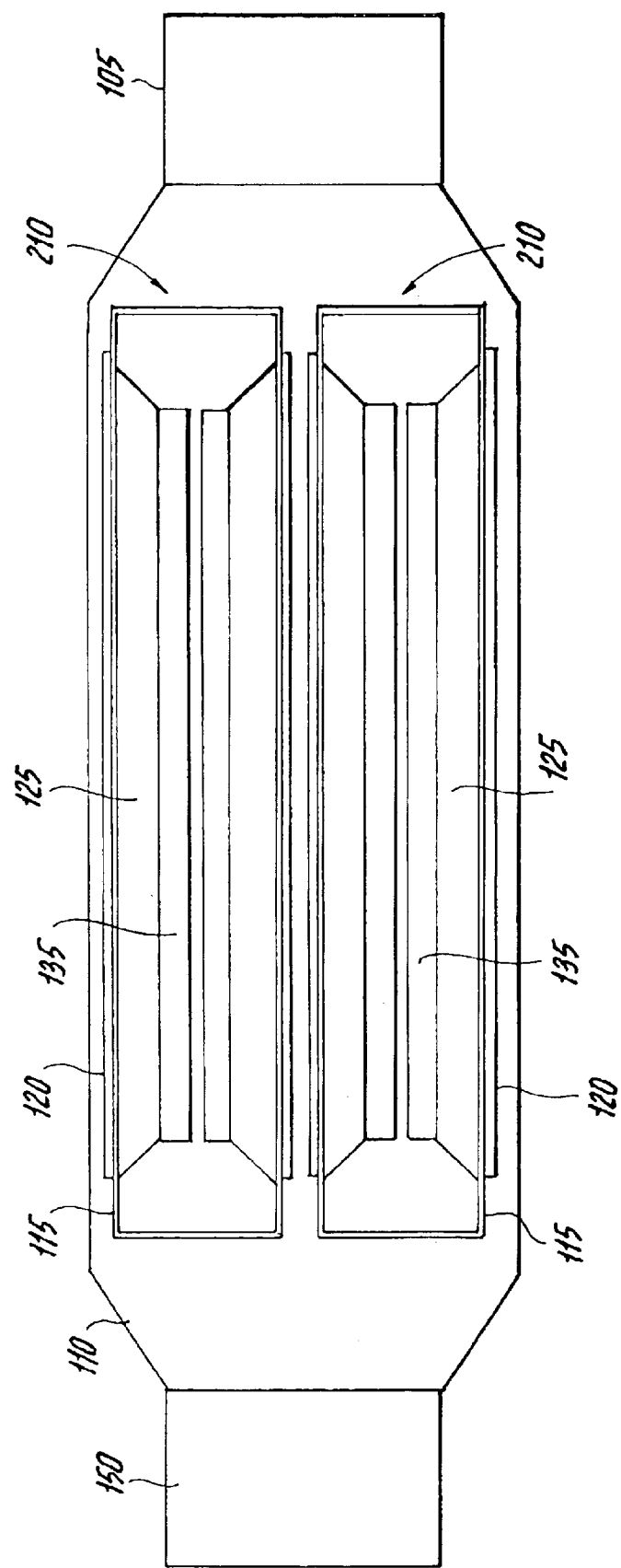
FIG. 2a is a longitudinal cross-sectional view of an exemplary embodiment of a system having two annular slot discharge plasma reactors in accordance with the present invention.
Figure 2B:
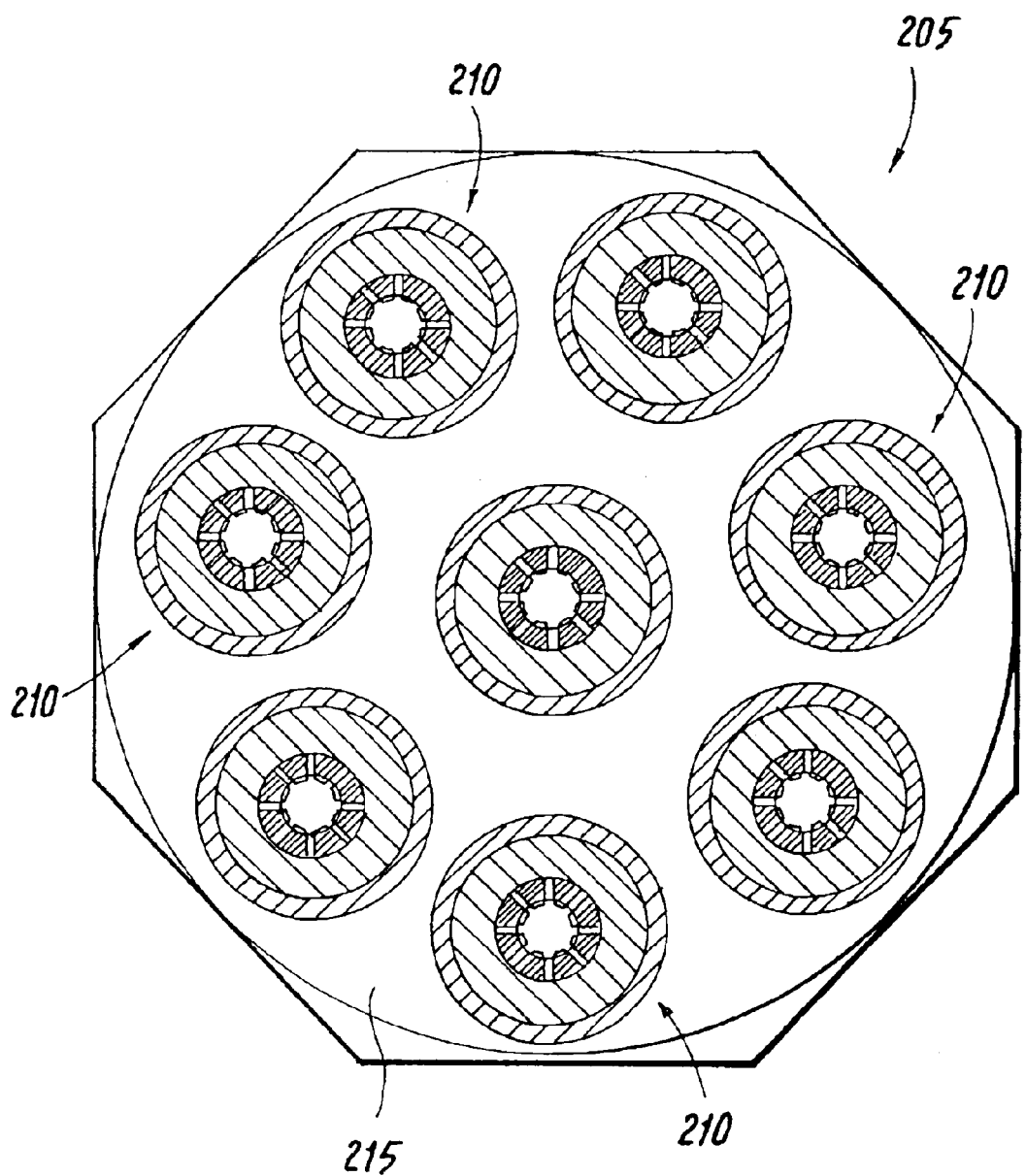
FIG. 2b is a lateral cross-sectional lateral view of an exemplary embodiment of a system having eight annular slot discharge plasma reactors in accordance with the present invention.

Multiple annular reactors may be combined in a single system. By way of example, FIG. 2a is a longitudinal cross-sectional view of a system having two annular reactors, while FIG. 2b shows a lateral cross-sectional view of a system having eight reactors 210 enclosed in a common housing 205. The space in the housing 205 between the reactors 210 is preferably filled with a dielectric material 215 to ensure that all of the fluid to be treated passes through the plasma region 155 of a reactor 210. The system may be designed to include any number of reactors to be arranged, as desired, within the housing. This embodiment is particularly suited for relatively large flow rates of fluid to be treated wherein a relatively large reactor system is desirable. By way of example, each reaction chamber shown in FIGS. 2a and 2b may be configured similar to that shown and described with respect to FIGS. 1a–1f.

Figure 3:
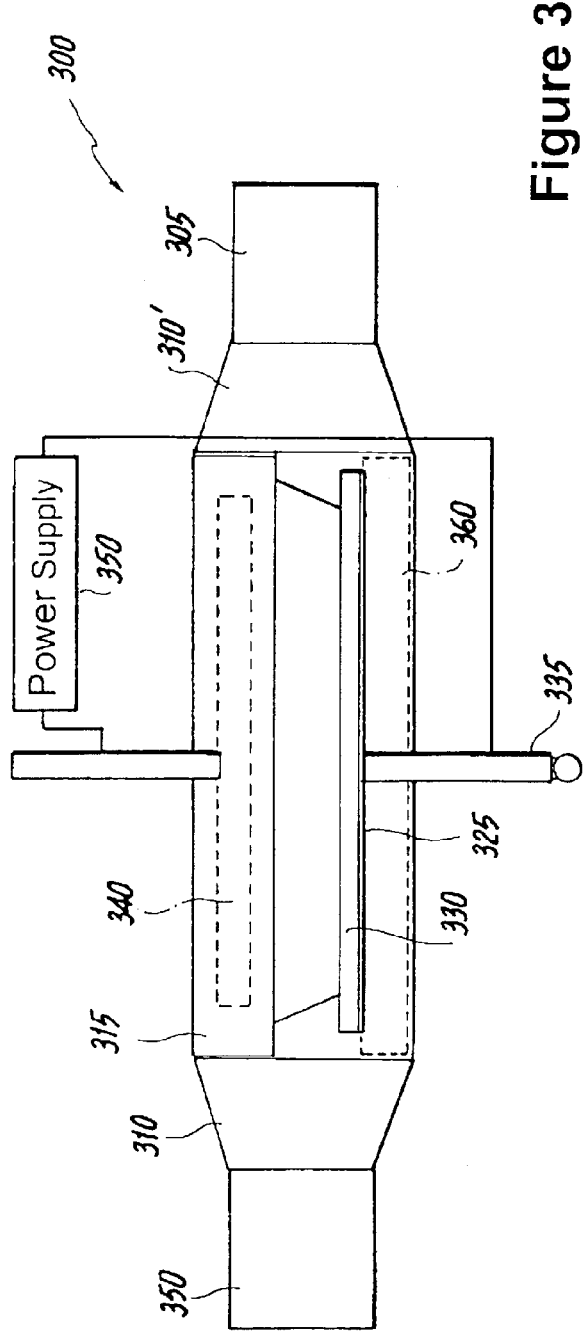
FIG. 3 is a longitudinal cross-sectional view of a single rectangular shaped slot discharge plasma reactor system in accordance with the present invention.
Figure 4:
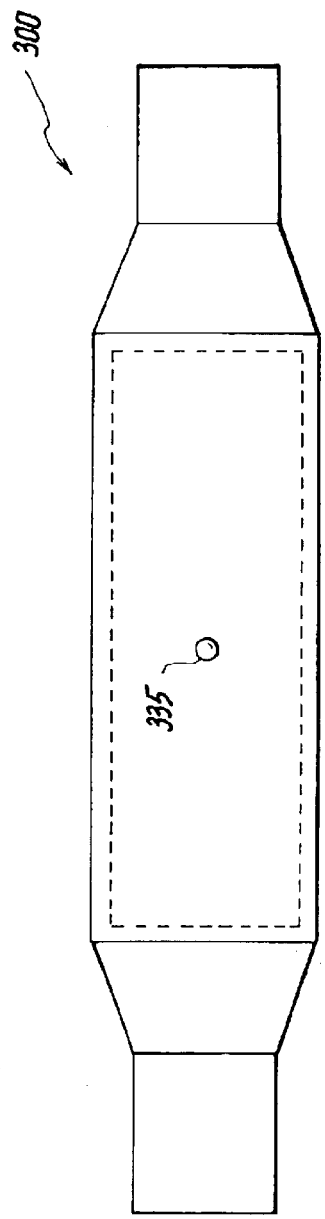
FIG. 4 is a top view of the reactor of FIG. 3.

Instead of the reactor having an annular or tubular shape as shown and described in the embodiments thus far, the reactor may have a rectangular shape as shown in FIGS. 3 and 4. The dimensions, e.g., the length, width and gap length, of the reactor 300 may be modified, as desired, to accommodate specific applications. Reactor 300 has an inlet 350 connected to the reaction chamber by a transition conduit 310, as in the foregoing embodiments. The reaction chamber itself includes a second conductive electrode 340, preferably extending substantially the full width and length of the reaction chamber. Conductive electrode 340 is embedded in a second dielectric plate 315. A first dielectric 330 having slots therein (not shown) is in direct contact with a first electrode 325 comprising a plurality of electrode segments. By way of example, each electrode segment is a rectangular shaped rim disposed about the perimeter of each slot, as shown in FIGS. 1c and 1d. A hollow tube 335 is connected to the segmented electrode 325 that may be used as a conduit through which a supply of reagent gases may be fed to improve the stability or optimize chemical reactions in the plasma. Chemical reactions take place in a plasma region that includes the slots defined in the first dielectric 330 as well as the area between the two dielectrics 315, 330. The treated fluid is discharged from the transition conduit 310' and through the outlet 305. The outside housing 360 of the reactor 300 is preferably made of a dielectric material.

Multiple rectangular plate reactors such as the one shown in FIGS. 3 and 4 may be combined together in a single housing. Similar to that in FIG. 2b, the space within the housing between the reactors would preferably be filled with a dielectric material to ensure that all of the fluid to be treated is channeled through the plasma region of one of the reactors. This embodiment using multiple reactors is particularly well suited for applications in which a relatively large flow rate of contaminated gas is to be treated and a relatively large combined reactor system is desirable.

In the embodiments shown in FIGS. 1–4, the dimensions of the reaction chamber may be selected as desired such that the residence time of the contaminants within the plasma regions is sufficient to ensure destruction of the contaminant to the desired level, for example, destruction of to the contaminants down to the molecular level.

Below are four exemplary reaction mechanisms that play an important role in plasma enhanced chemistry. Common to all mechanisms are electron impact dissociation and ionization to form reactive radicals. The four reaction mechanisms are summarized in the examples below:

(1) oxidation: e.g. conversion of $CH_4$ to $CO_2$ and $H_2O$

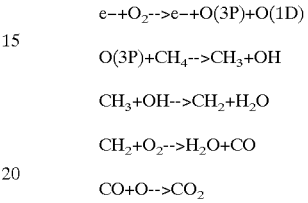

(2) reduction: e.g. reduction of NO into $N_2$+O

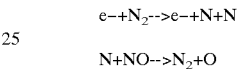

(3) electron induced decomposition: e.g. dissociative electron attachment to $CCl_4$

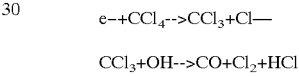

(4) ion induced decomposition: e.g. decomposition of methanol

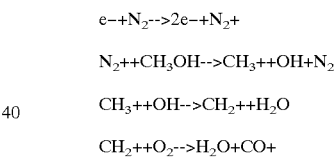

Figure 5A:
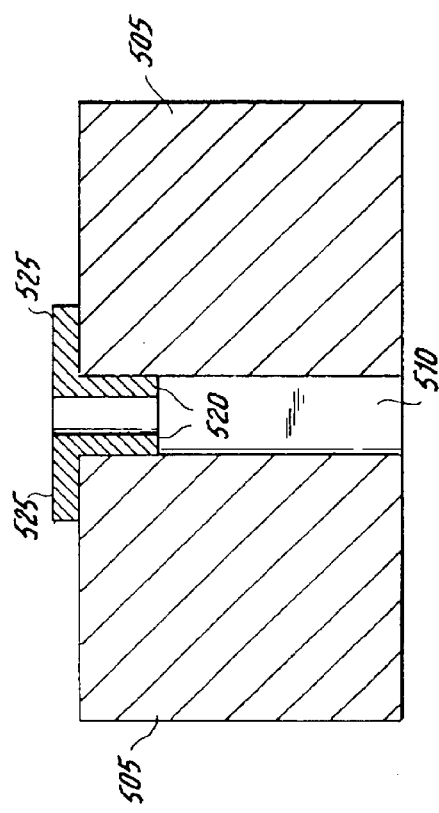
FIG. 5a is a cross-sectional view of an exemplary hollow rectangular plug electrode segment partially inserted into an associated slot defined in the first dielectric.
Figure 5B:
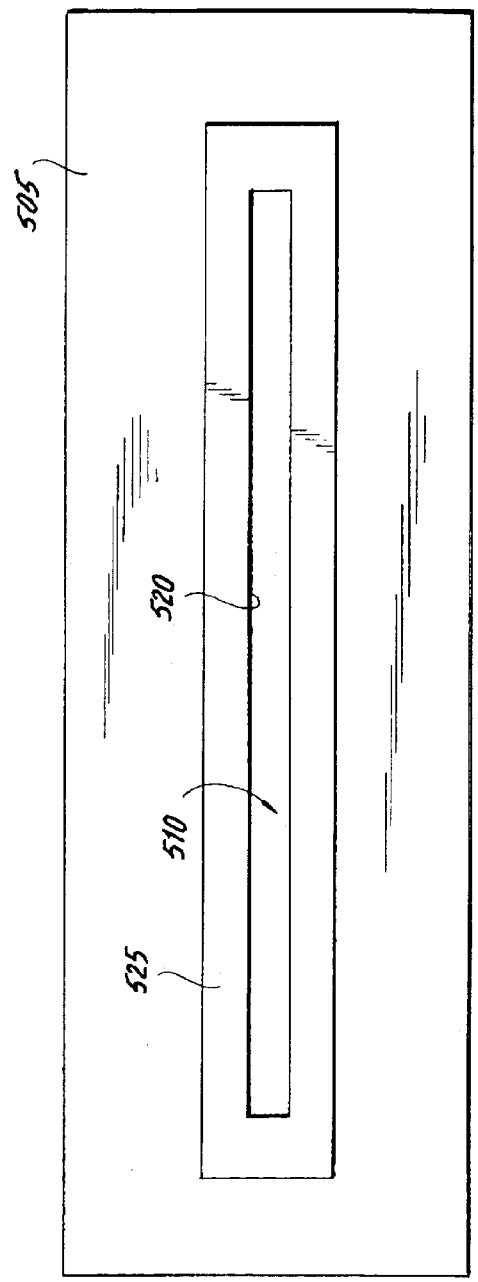

In the foregoing embodiments the electrode segments comprising the first electrode have been shown and described as a rectangular shaped rim with a hollow opening disposed about the perimeter of each slot. However, the present invention contemplates that the electrode segments may be configured in many different ways. FIGS. 5–8 show the configuration of a single electrode segment and an associated slot in the first dielectric. Although only a single slot and associated electrode segment is shown, the same electrode segment structure and arrangement may be used for a plasma reactor having multiple slots. FIG. 5a is a cross-sectional view of a first embodiment of a rectangular shaped rim electrode segment 520 having a T-shaped cross-section with a portion thereof inserted partially into a respective slot 510 defined in a first dielectric 505. Shoulder components 525 insure that the electrode is inserted substantially uniformly and securely in the slot 510, however the shoulder regions 525 are not essential as described later. In an alternative embodiment, rectangular shaped rim electrode segment 520 may be disposed above, substantially flush with the dielectric, or extend any desired depth into the slot 510. Since rectangular shaped rim electrode segment is open or hollow in the center a reagent fluid and/or the fluid to be treated may be passed through the opening of the electrode segment itself and into the slots of the first dielectric. Under such conditions, treatment of the fluid by exposure to the plasma may occur in the slot and/or the channel between the first and second dielectrics.

Figure 6A:
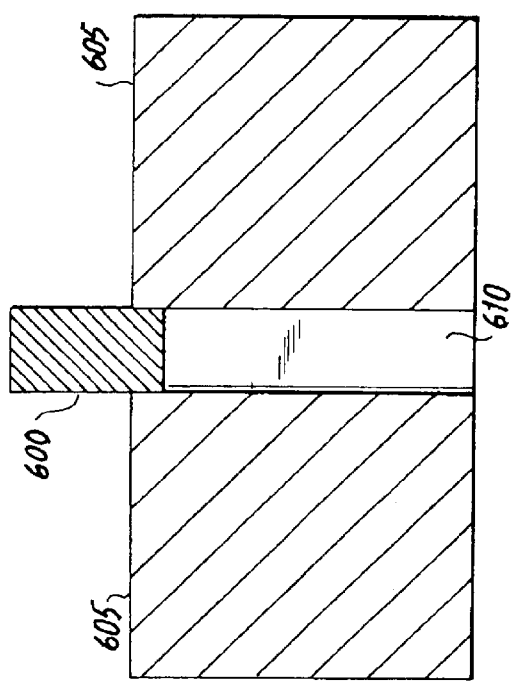
FIG. 6a is a cross-sectional view of an exemplary solid rectangular plug electrode segment having a blunt edge partially inserted into an associated slot defined in the first dielectric.
Figure 6B:
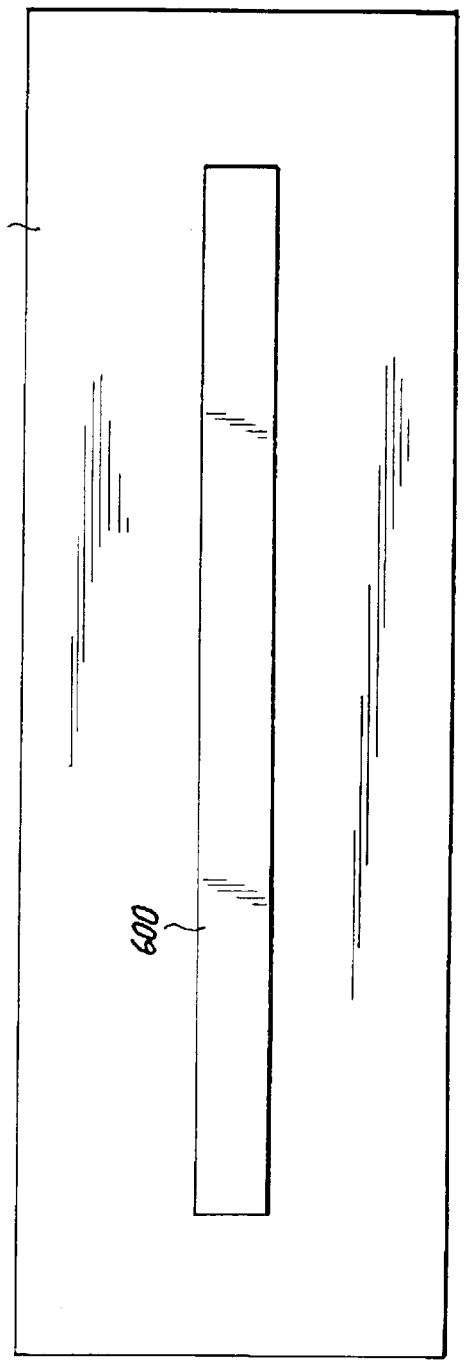

FIGS. 6a and 6b show a cross-sectional view and a top view, respectively, of a solid rectangular bar segmented electrode 610 having a blunt end inserted partially into a slot 600 defined in a first dielectric 605. In an alternative embodiment, the electrode segment 610 may be disposed above, substantially flush with, or inserted to any desired depth into the slot 600. The rectangular bar electrode segment 610 may be solid or porous. If a porous electrode 610 is used, the fluid to be treated may be passed directly through the electrode segment thereby optimizing exposure to the plasma discharge that occurs within the slot. Since the fluid to be treated when passed through the electrode segment may be treated by the plasma discharge created in the slot 600 itself, in this case, the second electrode and second dielectric may be eliminated altogether. Another advantage to using a porous electrode 610 is that it also serves as a conduit for the supply of a reagent gas to improve the stability, optimize the chemical reactions with the plasma, or perform chemical reactions within the plasma.

Figure 7A:
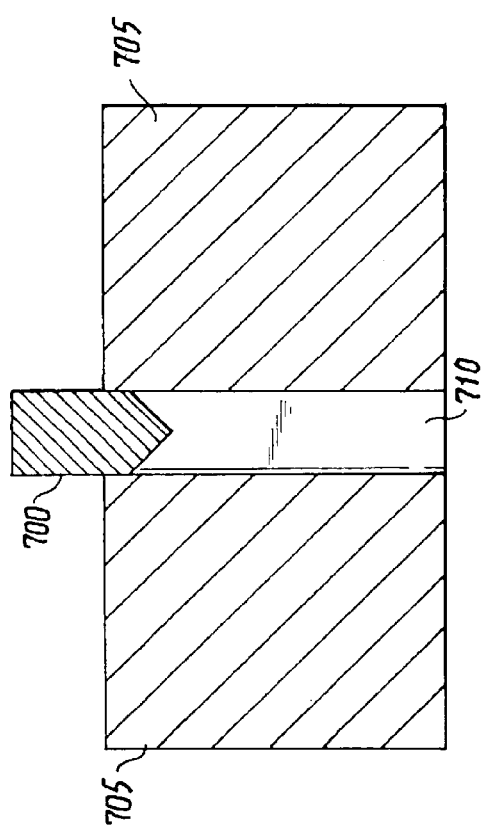
FIG. 7a is a cross-sectional view of an exemplary solid rectangular plug electrode segment terminating in a razor edge partially inserted into an associated slot defined in the first dielectric.
Figure 7B:
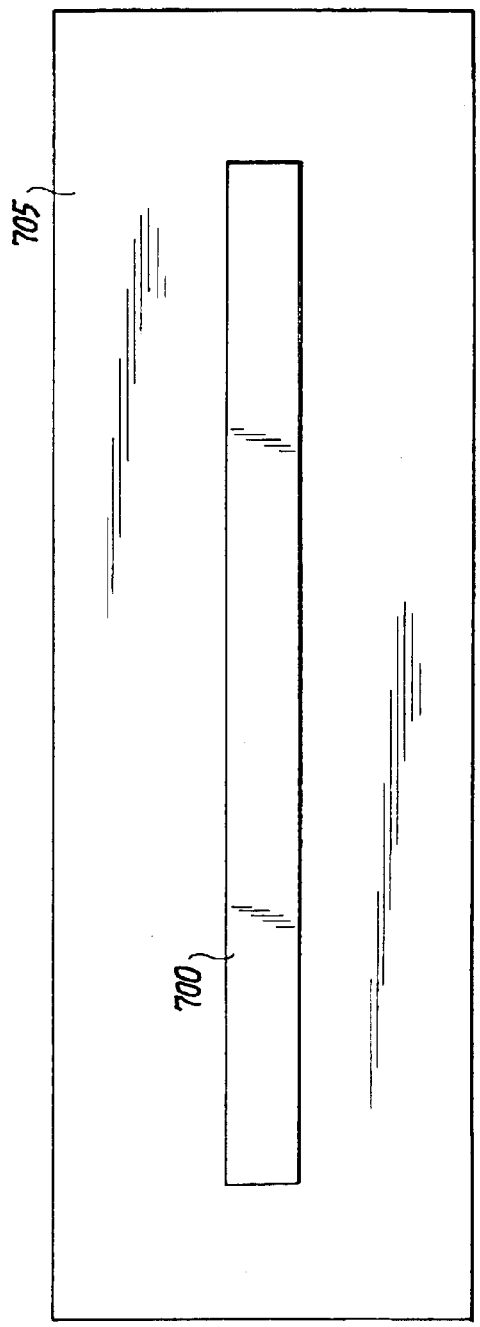

In FIGS. 6a and 6b the solid rectangular bar electrode segment has a blunt (e.g., substantially flat, rounded, concave or convex) end protruding into the slot, whereas in an alternative embodiment shown in FIGS. 7a and 7b the electrode segment 700 terminates in a razor edge. The exemplary electrode segment shown in both embodiments has a rectangular shape upper component, however, any desired shape may be used. Similarly, the shape and/or dimensions of the slot 600, 710 need not correspond to that of the electrode segment 610, 700, respectively, but instead can be any shape, length, or angle of direction through the dielectric. FIGS. 6b and 7b are top views of the electrode segment and dielectric of FIGS. 6a, 7a, respectively. It is clear from the top views in FIGS. 6b, 7b that the width of the electrode segment 610, 700 is substantially equal to the width of the slot 600, 710. The electrode segment and its respective slot, however, need not be substantially equal in diameter. In addition, the thickness of the first dielectric need not be substantially uniform and can vary over the length of the reactor. The slots are used to sustain plasma discharge and may also be used to introduce into the plasma region reagent gases to further stabilize the discharge, or deliver reactants to the origin of the plasma for the purpose of performing chemistry.

Figure 8A:
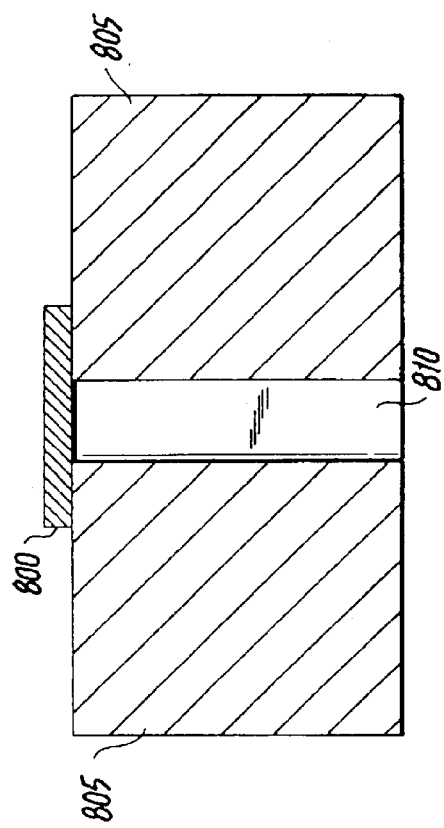
FIG. 8a is a cross-sectional view of an exemplary solid substantially flat rectangular bar electrode segment substantially flush with an associated slot defined in the first dielectric.
Figure 8B:
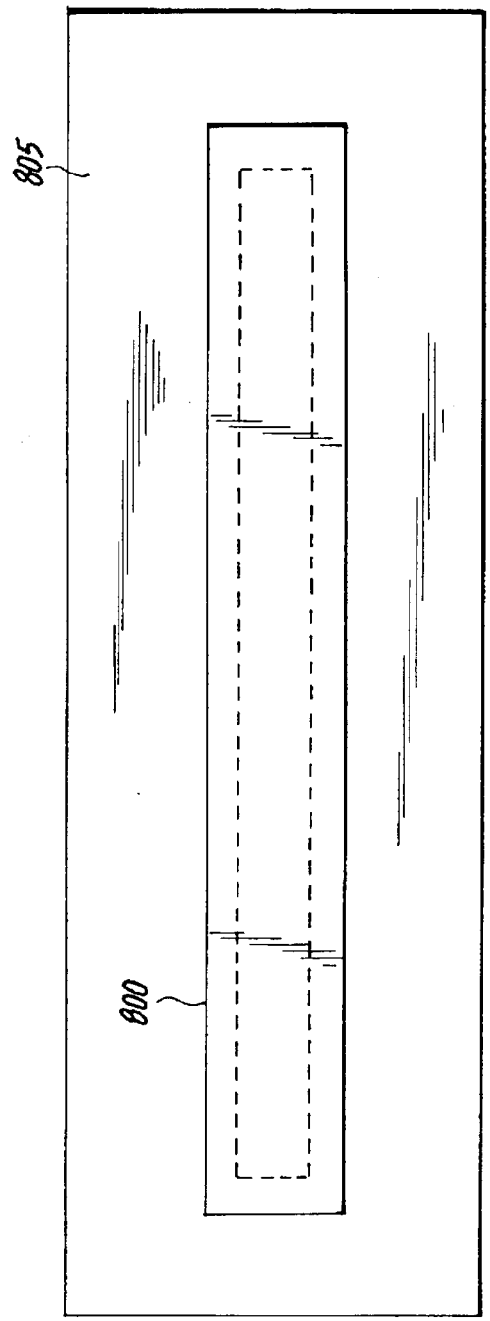
Figure 8C:
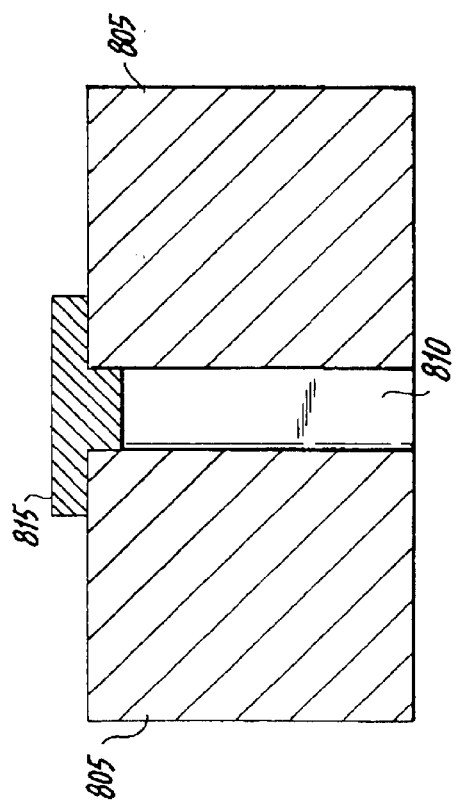
FIG. 8c is a cross-sectional view of an exemplary solid T-shaped plug electrode segment a portion of which extends into an associated slot defined in the first dielectric.
Figure 8D:
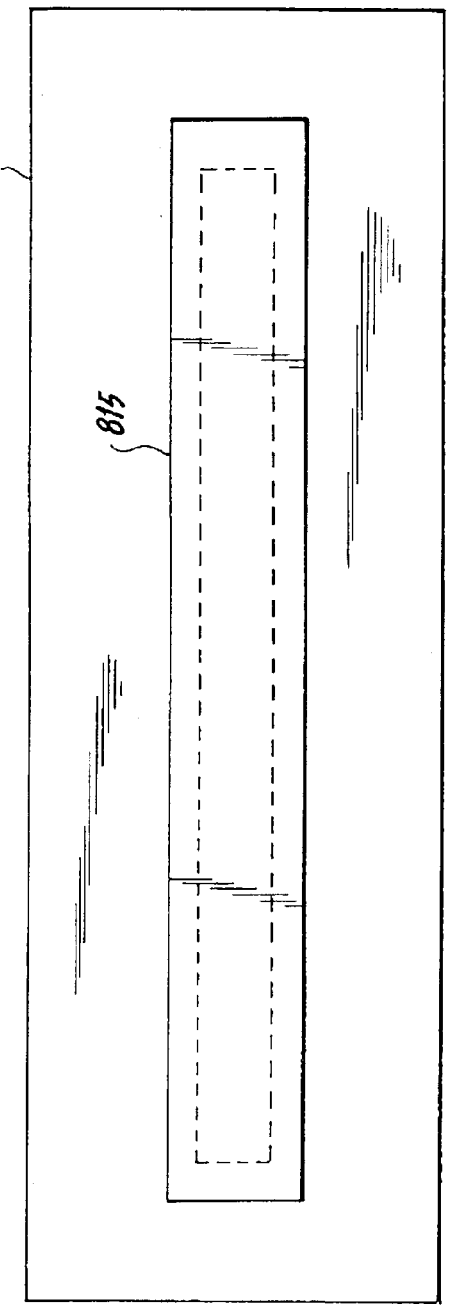
FIG. 8d is a top view of the electrode segment of FIG. 8c.
Figure 8E:
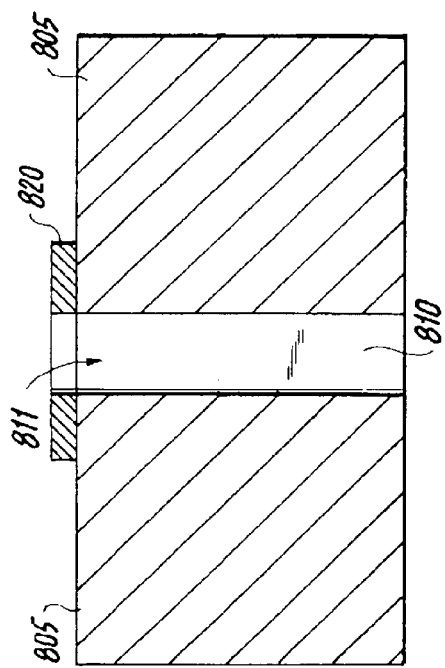
FIG. 8e is a cross-sectional view of an exemplary rectangular rim electrode segment substantially flush with disposed about the perimeter of an associated slot defined in the first dielectric.
Figure 8F:
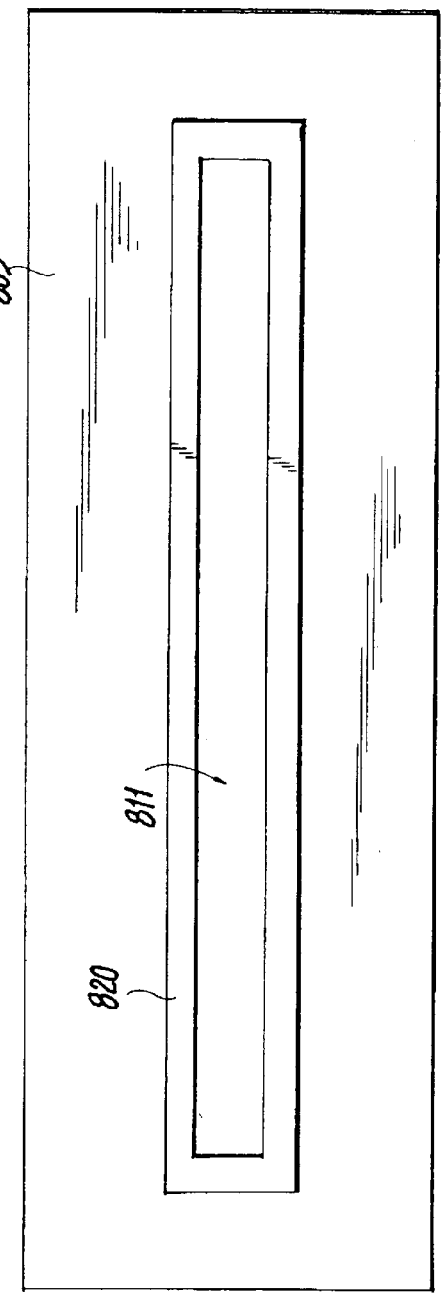
FIG. 8f is a top view of the electrode segment of FIG. 8e.

FIGS. 8a–8f show still other embodiments of the configuration of the segmented electrode. In particular, FIGS. 8a and 8b show a cross-sectional view and a top view, respectively, of a solid plate electrode segment 800 disposed over the slot 810 so as to be substantially flush and in, contact with the first dielectric 805. Alternatively, as shown in FIGS. 8c and 8d, the electrode segment may be in a T-shaped solid plug that extends partially into the slot 810. It is also within the intended scope of the invention to use a rectangular shape rim electrode segment 820 having an opening 811 defined therein to form a rectangular ring or washer, as shown in FIGS. 8e and 8f. The opening 811, in the embodiment shown in FIGS. 8e and 8f, being substantially aligned with the slot 810 defined in the first dielectric 805.

Different configurations for the electrode segment and its associated slot may be used based on any one or more of the following conditions: i) whether the electrode segment is solid, hollow, or porous; ii) the outer and/or inner shape of the electrode segment; iii) the dimensions of the electrode segment; and iv) whether the electrode segment is disposed above, substantially flush with the dielectric, or inserted at a predetermined depth into the slot.

The portion of the reaction chamber shown in FIG. 1d includes a second dielectric 115, whereas the second dielectric has been omitted, for convenience, in the embodiments shown in FIGS. 5a, 5b, 6a, 6b, 7a, 7b, 8a–8f. Any of these configurations in which the segmented electrode is hollow or made of a porous material may be implemented with or without a second dielectric and second electrode, as shown in FIG. 1d.

Figure 10A:
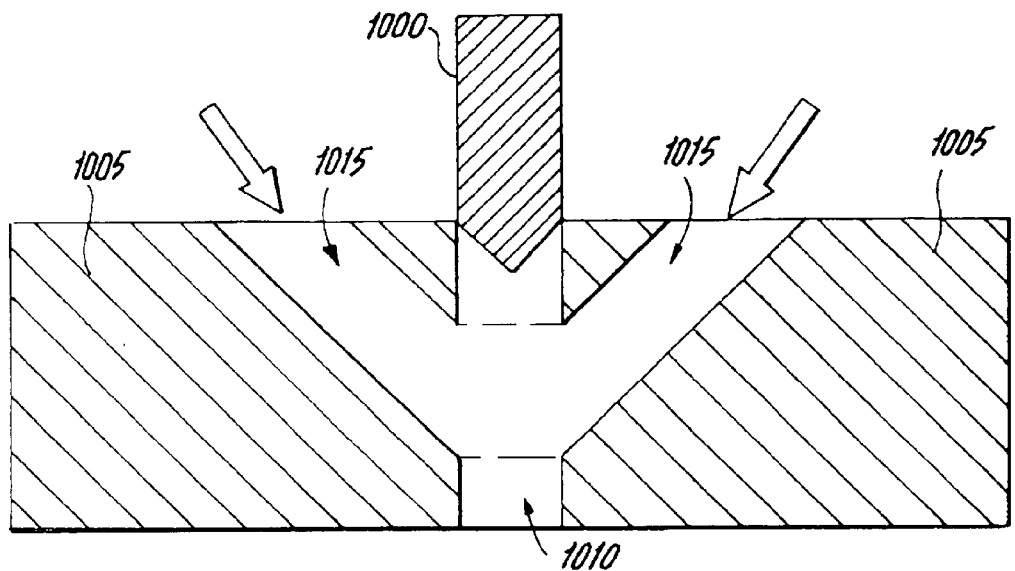
FIG. 10a is a cross-sectional view of an alternative embodiment of an electrode segment associated with a central slot of a first dielectric having auxiliary slots in fluid communication with the central slot for the injection of a reagent fluid.
Figure 10B:
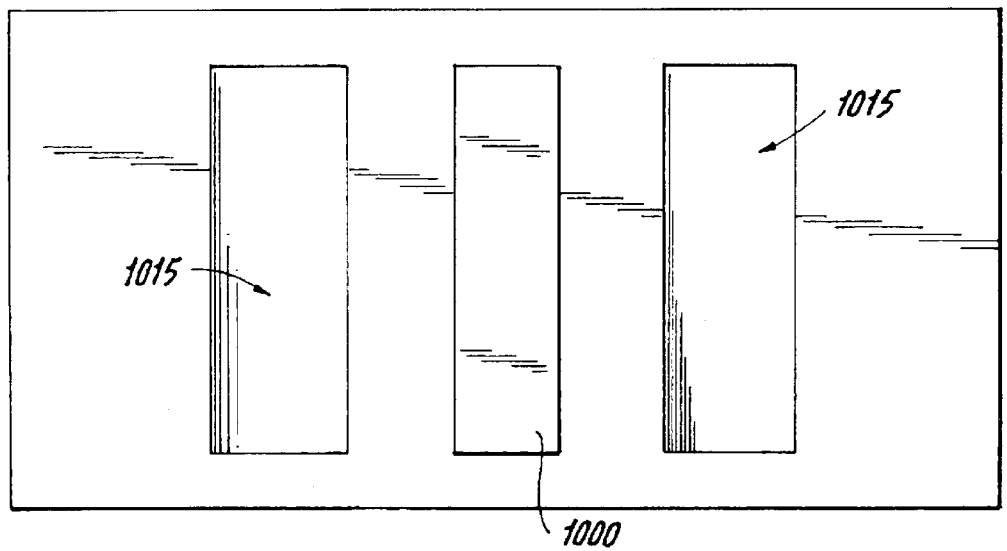

It is also within the intended scope of the invention to define auxiliary channels of any shape, dimension, or angle of direction in the first dielectric that do not have an associated electrode segment. FIGS. 9a and 9b show a cross-sectional view and a top view, respectively, of an exemplary solid rectangular bar electrode terminating in a razor edge that is partially inserted into a slot 910. Auxiliary channels 915 are defined in the dielectric 905 substantially parallel to the slot 910 into which the electrode segment 900 has been inserted. Reagent fluids/gases may be introduced into the auxiliary channels 915 to stabilize the plasma discharge or deliver reactants to the plasma for improving the chemical reactions. The auxiliary channels 915 may be defined in the dielectric at any desired angle. FIGS. 10a and 10b show two auxiliary channels 1015 defined in the dielectric 1005 so as to be in fluid communication with the slot 1010 having an associated solid rectangular bar electrode segment 1000.

Each of the aforementioned segmented electrode configurations have been shown and described by way of example. The features of each embodiment may be modified or combined with those of other embodiments as desired. The invention is not to be limited to the particular shape, dimension, number, or orientation of the electrodes or slots shown by way of example in the figures.

Figure 11:
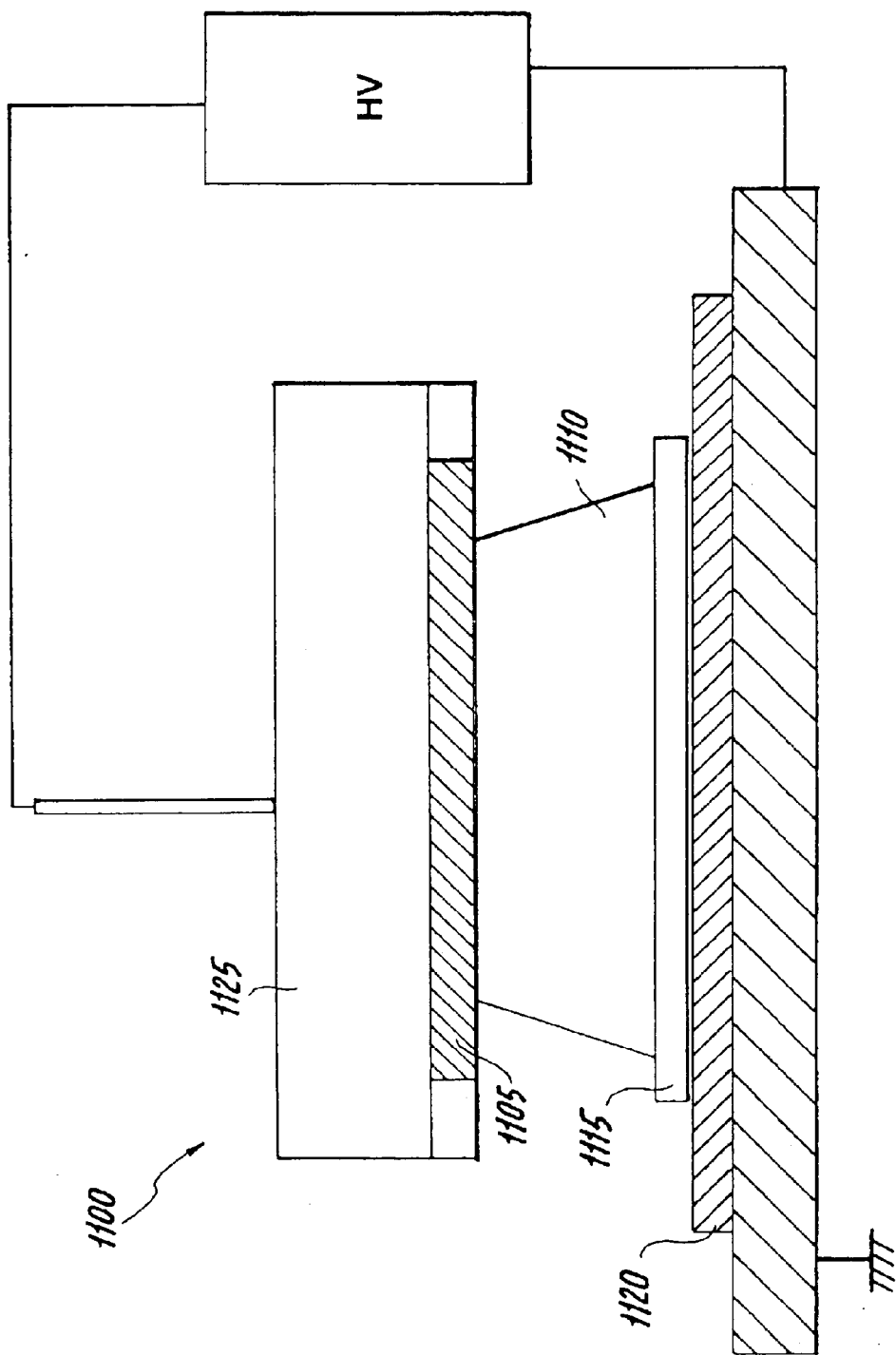
FIG. 11 is an exemplary surface cleaning system in accordance with the present invention.

The aforementioned embodiments have been described with reference to the treatment or purification of a contaminated fluid. Another application for the use of the plasma reactor in accordance with the present invention is for treating or cleaning a solid or porous surface. FIG. 11 is a schematic diagram of an exemplary surface cleaning system in accordance with the present invention. System 1100 includes a reactor 1125 including a first dielectric perforated with slots and the associated segmented electrode together denoted by reference element 1105. The segmented electrode and dielectric plate may be configured in accordance with any of the embodiments described above. Plasma is generated in the slots and discharged therefrom in the form of plasma jets 1110. An object is positioned so that the surface of the object to be cleaned is exposed to the plasma jets 1110. In the embodiment shown in FIG. 11, the object 1115 to be cleaned is positioned between two dielectrics 1105, 1120. Alternatively, the second dielectric 1120 may be eliminated, as described above.

Figure 12:
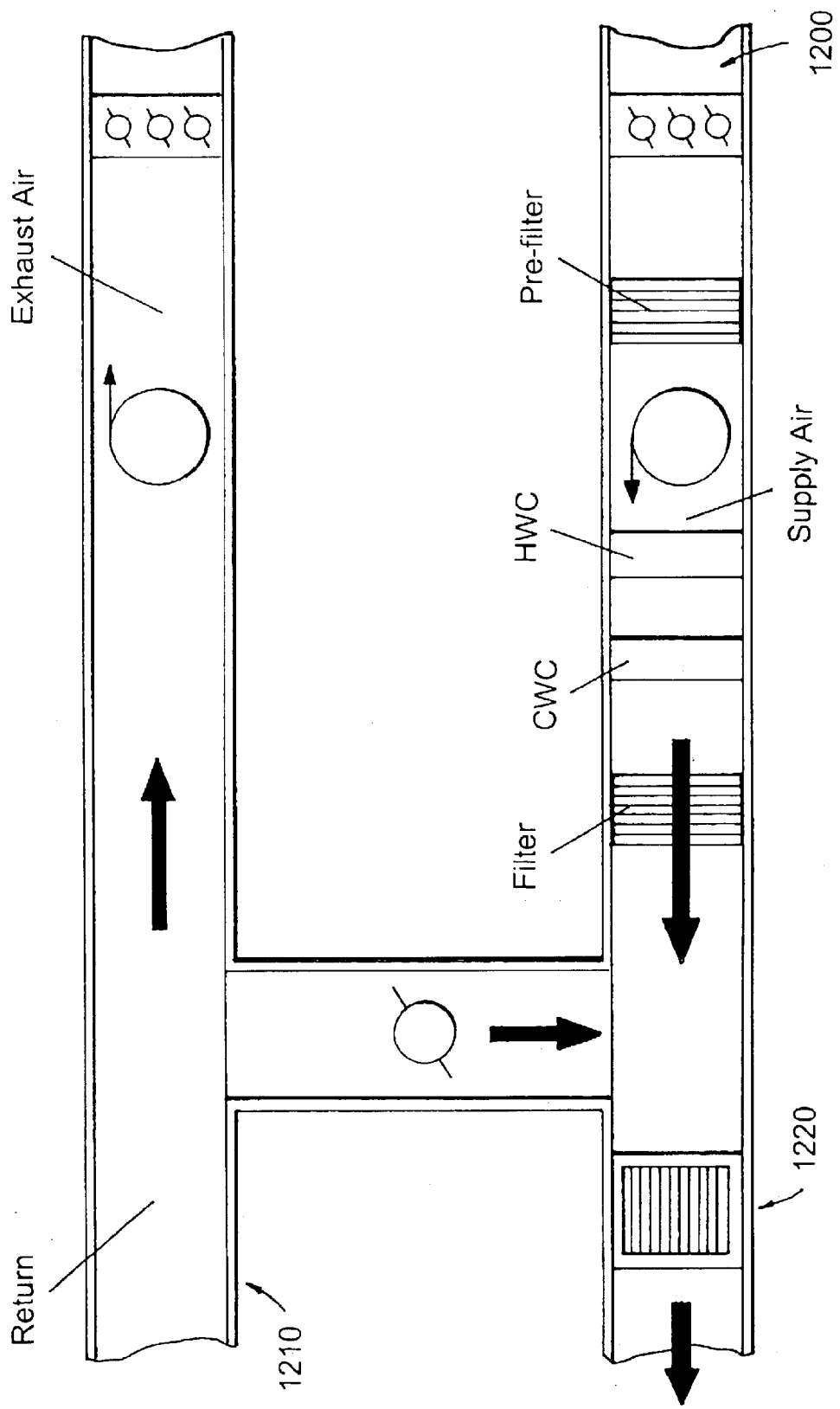
FIG. 12 is a schematic diagram of an exemplary air handler with a segmented electrode slot discharge plasma reactor in accordance with the present invention.

In yet another application, the slot discharge plasma system in accordance with the present invention may be used to purify gases. FIG. 12 is a schematic diagram of an exemplary air handler with a slot discharge plasma device for cleaning contaminated gases. The air to be purified is received in the inlet 1200, mixes with air from a return inlet 1210, and then passes through a segmented electrode slot discharge plasma air cleaning device 1220 before exiting the system. The plasma air cleaning device 1220 includes a plurality of segmented electrodes and opposing perforated dielectric plates arranged substantially parallel to one another. Plasma regions are formed between the segmented electrode and opposing dielectric plates. In the exemplary embodiment shown in FIG. 12 the slot discharge plasma air cleaning device 1220 is arranged after the supply air and mixing air are combined. The reactor system could alternatively be designed so that the slot discharge plasma air cleaning device 1220 is arranged at any one location or at multiple locations within the system.

The slot discharge, non-thermal plasma reactors in accordance with the present invention can be used to perform a variety of chemical reactions by exposing a fluid or surface containing the desired reactants to the high density plasma region where various processes such as oxidation, reduction, ion induced decomposition, or electron induced decomposition efficiently allow for chemical reactions to take place. The fluid to be treated may be fed either through the channel between the two dielectrics (transversely to the flow of the plasma discharged from the slots defined in the dielectric) and/or through the slots themselves (the point of origin of the plasma). Examples of reactions include: chemistry on various organic compounds such as Volatile Organic Compounds (VOCs) either single compounds or mixtures thereof; semi-volatile organic compounds, Oxides of Nitrogen (NOx), Oxides of Sulfur (SOx), high toxic organics, and any other organic compound that can be in the form of vapors of aerosols. In addition, the reactor can be used to pretreat combustion air to inhibit formation of NOx and increase fuel efficiency. Additional uses of the plasma includes the generation of ozone and ultraviolet light, and treatment of contaminated surfaces.

All references, publications, patents, and pending applications referred to herein are each incorporated by reference in their entirety.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. Method of treating a fluid in a plasma reactor including a first dielectric having at least one slot defined therethrough, and a first electrode, the first electrode being a segmented electrode including a plurality of electrode segments, only a single electrode segment being disposed proximate and in fluid communication with an associated slot, and at least one of the plural electrode segments is adapted to allow passage of a fluid to be treated therethrough, said method comprising the steps of:

passing the fluid to be treated through the at least one slot, wherein the slot has a length greater than its width; and exposing in the slot the fluid to be treated to plasma discharge prior to exiting from the slot.

2. The method in accordance with claim 1, wherein said passing step comprises passing the fluid to be treated through at least one electrode segment and associated slot.

3. The method in accordance with claim 1, wherein the electrode segment is hollow.

4. The method in accordance with claim 1, wherein the electrode segment is made of a porous material.

5. The method in accordance with claim 1, further comprising the steps of:

passing the fluid to be treated through a channel defined between the first dielectric and a second dielectric; and exposing in the channel the fluid to be treated to plasma discharged from the slot.

6. The method in accordance with claim 5, wherein said exposing step further comprises suppressing a glow-to-arc discharge at atmospheric pressure regardless of the presence of a carrier gas.

7. The method in accordance with claim 1, wherein the slot has a length to width ratio of greater than or equal to approximately 10:1.

8. The method in accordance with claim 1, wherein the slot has a length to width ratio of greater than or equal to approximately 100:1.

9. Method of treating a fluid in a plasma reactor including a first dielectric having at least one slot defined therethrough and a first electrode, the slot having a length greater than its width, the first electrode being is a segmented electrode including a plurality of electrode segments, only a single electrode segment being disposed proximate and in fluid communication with an associated slot, and at least one of the plural electrode segments is adapted to allow passage of a fluid to be treated therethrough, said method comprising the steps of:

passing the fluid to be treated through a channel defined between the first dielectric and a second dielectric; and exposing in the channel the fluid to be treated to plasma discharged from the slot.

10. The method in accordance with claim 9, wherein said exposing step further comprises suppressing a glow-to-arc discharge at atmospheric pressure regardless of the presence of a carrier gas.

11. The method in accordance with claim 9, wherein the slot has a length to width ratio of greater than or equal to approximately 10:1.

12. The method in accordance with claim 9, wherein the slot has a length to width ratio of greater than or equal to approximately 100:1.

13. A plasma reactor comprising:

a first dielectric having at least one slot defined therethrough, wherein the slot has a length greater than its width; and a first electrode disposed proximate and in fluid communication with the at least one slot, wherein the first electrode is a segmented electrode including a plurality of electrode segments, only a single electrode segment being disposed proximate and in fluid communication with an associated slot, and at least one of the plural electrode segments is adapted to allow passage of a fluid to be treated therethrough.

14. The plasma reactor in accordance with claim 13, wherein at least one of the electrode segments is shaped as a rectangular shaped bar.

15. The plasma reactor in accordance with claim 14, wherein the bar terminates in a blunt end oriented proximate the associated slot.

16. The plasma reactor in accordance with claim 14, wherein the bar terminates in a razor edge oriented proximate the associated slot.

17. The plasma reactor in accordance with claim 13, wherein at least one of the electrode segments is shaped as a rectangular shaped rim having a rectangular shape opening defined therethrough.

18. The plasma reactor in accordance with claim 13, wherein at least one of the electrode segments is a substantially flat rectangular plate.

19. The plasma reactor in accordance with claim 18, wherein the plate is solid.

20. The plasma reactor in accordance with claim 18, wherein the plate is porous.

21. The plasma reactor in accordance with claim 13, wherein at least one electrode segment is porous.

22. The plasma reactor in accordance with claim 13, wherein at least one electrode segment is hollow.

23. The plasma reactor in accordance with claim 13, wherein at least one of the electrode segments is disposed proximate and separated a predetermined distance from the first dielectric.

24. The plasma reactor in accordance with claim 13, wherein at least one of the electrode segments is disposed substantially flush and in contact with the first dielectric.

25. The plasma reactor in accordance with claim 13, wherein at least one of the electrode segments is partially inserted into the associated slot.

26. The plasma reactor in accordance with claim 13, wherein at least one of the electrode segments is fully inserted into the associated slot.

27. The plasma reactor in accordance with claim 13, further comprising:
   a second electrode; and
   a second dielectric proximate the second electrode, the first and second dielectrics being separated by a predetermined distance to form a channel therebetween.

28. The plasma reactor in accordance with claim 27, wherein the second electrode is a plate.

29. The plasma reactor in accordance with claim 27, wherein the second electrode is a segmented electrode including a plurality of electrode segments.

30. The plasma reactor in accordance with claim 13, wherein the first dielectric has a plurality of slots defined therethrough, the slots being arranged so that spacing between adjacent slots is substantially equal.

31. The plasma reactor in accordance with claim 13, wherein the first dielectric has a plurality of slots defined therethrough, the slots being arranged so that spacing between adjacent slots is not equal.

32. The plasma reactor in accordance with claim 13, wherein the segmented electrode has a substantially uniform thickness.

33. The plasma reactor in accordance with claim 13, wherein the segmented electrode has a non-uniform thickness.

34. The plasma reactor in accordance with claim 13, wherein the first dielectric has an auxiliary channel defined therethrough.

35. The plasma reactor in accordance with claim 13, wherein the first dielectric has an auxiliary channel defined therein and in fluid communication with the slot.

36. The plasma reactor in accordance with claim 13, wherein the first electrode is a plate.

37. The plasma reactor in accordance with claim 13, wherein the slot has a length to width ratio of greater than or equal to approximately 10:1.

38. The plasma reactor in accordance with claim 13, wherein the slot has a length to width ratio of greater than or equal to approximately 100:1.

39. The plasma reactor in accordance with claim 13, wherein the slot serves as a current choke suppressing glow-to-arc discharge at atmospheric pressure regardless of the presence of a carrier gas.

* * * * *